United States Patent
Bose et al.

(10) Patent No.: US 10,613,603 B2
(45) Date of Patent: *Apr. 7, 2020

(54) INDUCING HETEROGENEOUS MICROPROCESSOR BEHAVIOR USING NON-UNIFORM COOLING

(71) Applicant: International Business Machines Corporation, Armonk, NY (US)

(72) Inventors: Pradip Bose, Yorktown Heights, NY (US); Alper Buyuktosunoglu, White Plains, NY (US); Timothy Joseph Chainer, Putnam Valley, NY (US); Pritish Ranjan Parida, Fishkill, NY (US); Augusto Javier Vega, Astoria, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,095

(22) Filed: Mar. 6, 2019

(65) Prior Publication Data

US 2019/0204884 A1 Jul. 4, 2019

Related U.S. Application Data

(63) Continuation of application No. 15/238,452, filed on Aug. 16, 2016, now Pat. No. 10,317,962.

(51) Int. Cl.
*G05D 16/00* (2006.01)
*G06F 1/20* (2006.01)
(Continued)

(52) U.S. Cl.
CPC .............. *G06F 1/206* (2013.01); *G06F 1/324* (2013.01); *G06F 1/3206* (2013.01);
(Continued)

(58) Field of Classification Search
CPC ........ G06F 1/206; G06F 1/324; G06F 1/3206; G06F 2200/201; G05B 15/02
(Continued)

(56) References Cited

U.S. PATENT DOCUMENTS

| 4,109,707 A | 8/1978 | Wilson et al. |
| 6,795,786 B2 | 9/2004 | LaMarca et al. |

(Continued)

OTHER PUBLICATIONS

Coskun, et al., "Modeling and Dynamic Management of 3D Multicore Systems with Liquid Cooling," 2009 17th IFIP International Conference on Very Large Scale Integration (VLSI-SoC), 2009, 6 pages.

(Continued)

*Primary Examiner* — Vu A Vu
(74) *Attorney, Agent, or Firm* — Amin, Turocy & Watson, LLP

(57) ABSTRACT

Techniques for inducing heterogeneous microprocessor behavior using non-uniform cooling are described. According to an embodiment, a device is provided that comprises an IC chip comprising a plurality of cores and a cooling apparatus coupled to the integrated chip that cools the integrated chip in association with electrical operation of the plurality of cores. The cooling apparatus cools a first core of the plurality of cores to a lower temperature than a second core of the plurality of cores. In various embodiments, the cooling apparatus comprises a plurality of channels embedded within the integrated chip and the cooling apparatus cools the integrated chip via flow of liquid coolant through the plurality of channels.

20 Claims, 15 Drawing Sheets

(51) Int. Cl.
    *G06F 1/3206* (2019.01)
    *G06F 1/324* (2019.01)

(52) U.S. Cl.
    CPC ...... *G06F 2200/201* (2013.01); *Y02D 10/126* (2018.01); *Y02D 10/16* (2018.01)

(58) Field of Classification Search
    USPC .......................................................... 700/300
    See application file for complete search history.

(56) References Cited

U.S. PATENT DOCUMENTS

| | | | |
|---|---|---|---|
| 7,055,540 | B2 | 6/2006 | Oka et al. |
| 7,107,777 | B2 | 9/2006 | Vaiyapuri et al. |
| 7,204,298 | B2 | 4/2007 | Hodes et al. |
| 7,515,415 | B2 * | 4/2009 | Monfarad ............. H01L 23/473 165/80.4 |
| 7,518,871 | B2 | 4/2009 | Campbell et al. |
| 7,652,372 | B2 | 1/2010 | Dishongh et al. |
| 7,653,824 | B2 * | 1/2010 | Rangarajan ............. G06F 1/206 713/300 |
| 7,990,711 | B1 | 8/2011 | Andry et al. |
| 8,170,724 | B2 | 5/2012 | Kelley et al. |
| 8,417,917 | B2 * | 4/2013 | Emma ................... G06F 9/3836 712/10 |
| 8,522,570 | B2 | 9/2013 | Ouyang et al. |
| 8,902,943 | B2 * | 12/2014 | Bishop .................. H01S 3/0404 372/34 |
| 9,052,724 | B2 | 6/2015 | Bernstein et al. |
| 9,301,424 | B2 | 3/2016 | Bernstein et al. |
| 10,317,962 | B2 * | 6/2019 | Bose ....................... G06F 1/206 |
| 2006/0051214 | A1 | 3/2006 | Ussing |
| 2008/0186674 | A1 | 8/2008 | Muraki |
| 2008/0308260 | A1 | 12/2008 | Campbell et al. |
| 2009/0145576 | A1 | 6/2009 | Wyrick et al. |
| 2012/0039041 | A1 | 2/2012 | Mowry et al. |
| 2012/0284547 | A1 * | 11/2012 | Culbert .................... G06F 1/20 713/322 |
| 2014/0311912 | A1 | 10/2014 | Shih et al. |
| 2014/0332198 | A1 | 11/2014 | Eckberg et al. |
| 2015/0138731 | A1 | 5/2015 | Mann et al. |
| 2015/0261901 | A1 | 9/2015 | Maitra et al. |
| 2016/0187580 | A1 | 6/2016 | Vishkin |

OTHER PUBLICATIONS

Office Action for U.S. Appl. No. 15/238,452 dated Sep. 21, 2018, 45 pages.
List of IBM Patents or Applications Treated as Related.
Non-Final Office Action for U.S. Appl. No. 15/277,725, dated Dec. 15, 2017 19 pages.
Lake Shore Cryotronics, Instructions CS Series Capacitance Temperature Sensor, Model CS-401 and CS-502, May 1, 2014, Lake Shore Cryotronics, Form No. F013-00-00 Revision B (Year: 2014).
Office Action dated Apr. 23, 2018 for U.S. Appl. No. 15/277,725, 22 pages.
Office Action for U.S. Appl. No. 15/277,725 dated Oct. 3, 2018, 25 pages.
"WAWRO""A Hacker Speaks: How Malware Might Blow Up Your Laptop,"" Jul. 28, 2011, PCWorld, 6 pages. https://www.pcworld.com/article/236875/batteries_go_boom.html".
Final Office Action received for U.S. Appl. No. 15/277,725 dated Apr. 30, 2019, 33 pages.

* cited by examiner

INDUCING HETEROGENEOUS MICROPROCESSOR BEHAVIOR USING NON-UNIFORM COOLING

STATEMENT REGARDING FEDERALLY SPONSORED RESEARCH OR DEVELOPMENT

This invention was made with Government support under Contract No.'s: FA8650-14-C-7466, HR0011-13-C-0022 awarded by Defense Advanced Research Projects Agency (DARPA). The Government has certain rights in this invention.

BACKGROUND

The subject disclosure relates to microprocessors, and more specifically, inducing a heterogeneous microprocessor behavior using non-uniform cooling.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, apparatuses, and/or computer-implemented methods that facilitate inducing a heterogeneous microprocessor behavior using non-uniform cooling are described.

According to an embodiment, a device is provided that comprises an integrated circuit (IC) chip comprising a plurality of cores and a cooling apparatus coupled to the integrated chip that cools the integrated chip in association with electrical operation of the plurality of cores. The cooling apparatus can cool a first core of the plurality of cores to a lower temperature than a second core of the plurality of cores. In various embodiments, the cooling apparatus comprises a plurality of channels embedded within the IC chip and the cooling apparatus can cool the integrated chip via flow of liquid coolant through the plurality of channels. In some implementations, the first core performs at a higher operation frequency than the second core during the electrical operation of the plurality of the cores based on the first core having the lower temperature than the second core. The device can also include a thread controller that assigns a computational workload to the first core based on a time constraint for completion of the computational workload and the higher operation frequency of the first core relative to the operation frequency of the second core. In other implementations, the device can include a thread controller that assigns a computational workload to the first core, a frequency controller that directs the first core to perform the computational workload at a higher operation frequency relative to a frequency of operation of the second core based on a time constraint for completion of the computational workload, and a cooling controller that directs the cooling apparatus to cool the first core to the lower temperature than the second core based on the higher operation frequency.

According to another embodiment, a computer-implemented method can comprise cooling, by a device operatively coupled to a multi-core processor, a first core of a plurality of cores of the multi-core processor to a lower temperature than a second core of the plurality of cores, wherein the plurality of cores are provided on one or more integrated circuit chips. The method can further comprise directing, by the device, the first core to perform a computational workload at a higher frequency of operation relative to a frequency of operation employed by the second core of the plurality of cores based on the cooling. In some implementations, the cooling comprises employing a cooling apparatus embedded on the one or more IC chips, wherein the cooling apparatus is configured to cool the first core to the lower temperature than the second core. In other implementations, the cooling comprises controlling flow of liquid coolant through respective channels of a cooling apparatus embedded within the one or more IC chips resulting in the cooling of the first core to the lower temperature than a second core.

According to another embodiment, a computer-implemented method is provided that comprises assigning, by a device operatively coupled to a multi-core processor, a computational workload to a first core of a plurality of cores of the multi-core processor, wherein the plurality of cores are provided on one or more an integrated circuit chips. The method can further comprise directing, by the device based on the computational workload, the first core to perform the computational workload at a higher frequency of operation relative to a frequency of operation employed by a second core of the plurality of cores, and cooling, by the device, the first core to a lower temperature relative to the second core based on the directing. In various embodiment, the directing comprises directing the first core to perform the computational workload at the higher frequency based on a time constraint for performance of the computational workload.

DETAILED DESCRIPTION

Figure 1:
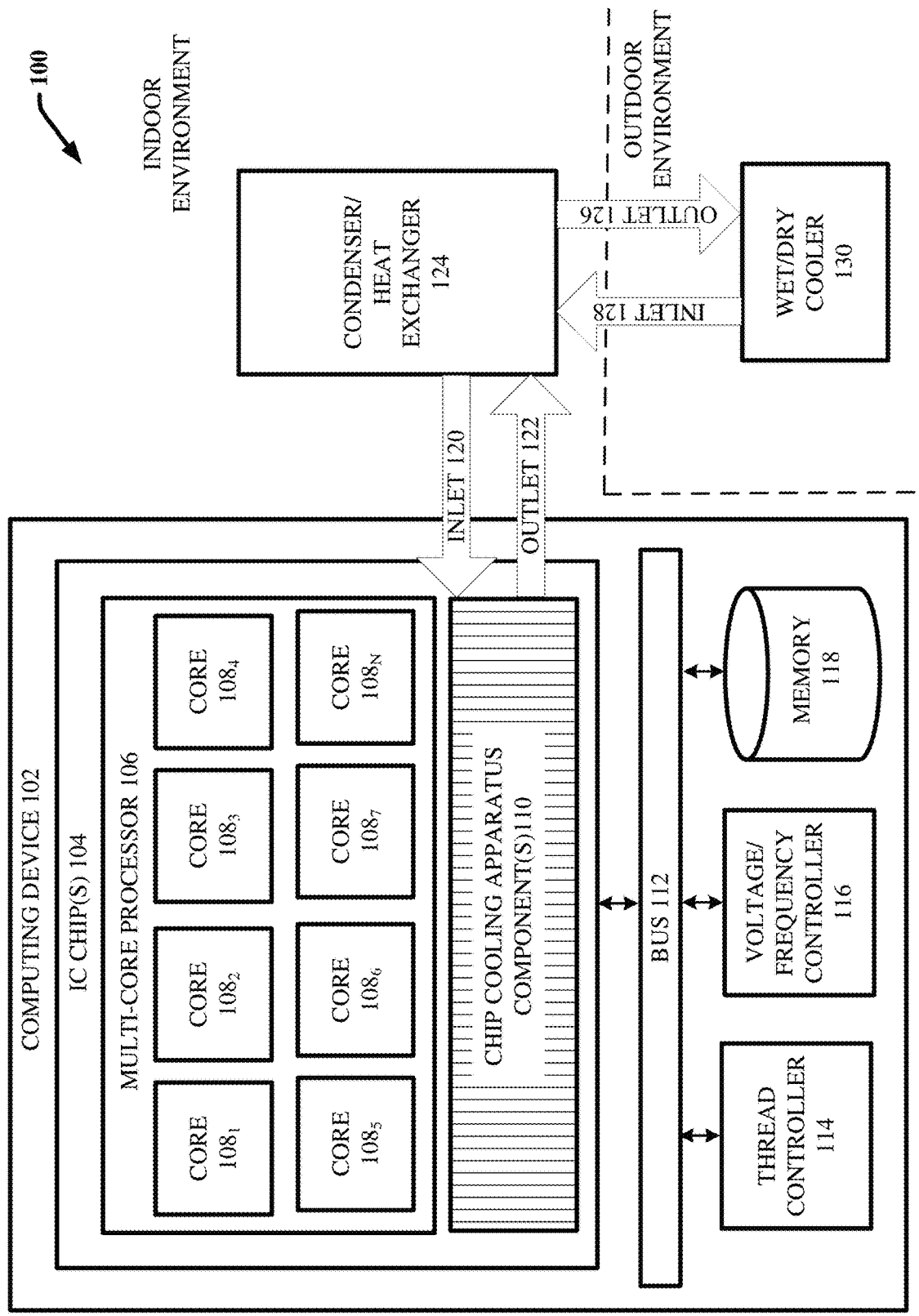
FIG. 1 illustrates a block diagram of an example, non-limiting system that facilitates inducing a heterogeneous microprocessor behavior using non-uniform cooling in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to systems, devices, apparatuses, and/or computer-implemented methods that facilitate inducing a heterogeneous microprocessor behavior using non-uniform cooling. A multi-core processor is a single computing component with two or more independent actual processing units or "cores," which are the units that read and/or execute program instructions. Multiple cores can run multiple instructions at the same time, increasing overall speed for programs amenable to parallel computing. Multiple cores can be integrated onto a single IC die or chip (also referred to as a "chip multiprocessor" or (CMP)), or onto multiple chips that can be coplanar or stacked and contained within a single chip package.

The subject disclosure provides systems, apparatuses, and/or computer-implemented methods that employ non-uniform cooling of micro-processor cores using non-uniform cooling technologies to optimize power-performance efficiency. In particular, the subject cooling techniques employ a cooling apparatus designed to cool some cores of a multi-core processor to lower temperatures than the temperature of other cores. In various embodiments, the cooling apparatus can include an air heat sink or fluid coolant path provided within close proximity (e.g., within 150 micrometers (μm)) to an IC chip or IC chip stack that is designed to cool respective cores of the IC chip or IC chip stack differently. For example, in some implementations, the cooling apparatus can include a plurality of cooling channels embedded in the IC chip or chip stack through which liquid coolant is passed. Cooling of the IC chip can be achieved via removal of heat from the liquid coolant using a liquid to liquid heat exchanger or via condensing vapor resulting from boiling of the liquid coolant within the channels (e.g., using a condenser). According to this example, non-uniform cooling can be achieved via controlling of the amount and flow rate of liquid coolant through different channels associated with different cores such that certain areas of the chip and associated cores are cooled to lower temperatures than others.

The cores that are cooled to a lower temperature than other cores (referred to herein as the "overcooled" cores) can be operated at a relatively higher frequency (e.g., up to about 5.0 GHz as compared to nominal 2.0-4.0 GHz. Thus by utilizing non-uniform cooling, a subset of cores per chip can be operated at higher frequency than other cores of the chip to provide a significant throughput boost. In addition, thermal variations across the chip can be minimized for different core specific activities.

In some embodiments, the cores that are to be run at a higher frequency can be determined prior to fabrication of the IC chip and/or prior to integration of the cooling apparatus on or within the chip. This decision can be made based on statistical distribution of core-to-core variability, chip test or qualification data, chip layout and cooling apparatus capabilities. The cooling apparatus can then be designed to overcool those cores to be run at the higher frequency and integrated on, within or near the chip. In other embodiments, the cores to be run at the higher frequency can be determined during run-time based on above defined factors or actively by performing in-situ calibration of each core performance for different workloads. According to these embodiments, the cooling apparatus can be actively manipulated during runtime to control cooling of the respective cores as needed. In addition, real-time feedback can be received via thermal sensors associated with each of the cores indicating temperatures of the respective cores. In some implementations, the cooling apparatus can be dynamically adapted to cool certain cores based on the temperature feedback. Likewise, the operating frequency and/or voltage of the respective cores can be dynamically adapted based on the temperature feedback and demanding workloads can be scheduled to those cores that can be run at higher frequencies/voltages based on the temperature feedback.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting system 100 that facilitates inducing a heterogeneous microprocessor behavior using non-uniform cooling in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As shown in FIG. 1, system 100 includes a computing device 102, a condenser/heat exchanger 124 and a wet/dry cooler 130. In various embodiments, the computing device 102 and the condenser/heat exchanger 124 are located within an indoor environment (e.g., a physical air conditioned data center), and the wet/dry cooler 130 is located in an outdoor environment (e.g., outside of the physical air conditioned data center). However, it should be appreciated that the physical locations of the computing device 102, the condenser/heat exchanger 124 and the wet/dry cooler 130 can vary so long as the respective devices/components are physically connected. The computing device 102 can include any type of computing device that employs a multi-core processor. For example, the computing device 102 can include a server device provided in a data center having multiple servers (e.g., a single rack of servers to hundreds or thousands of servers) or a laptop computer. In other examples, the computing device 102 can include but is not limited to: a desktop computer, a television, an Internet enabled television, a mobile phone, a smartphone, a tablet user computer (PC), a digital assistant (PDA), a HUD, virtual reality (VR) headset, an augmented reality (AR) headset, or another type of wearable computing device.

The computing device 102 can include a multi-core processor 106 including a plurality (e.g., two or more) of cores 108 formed on one or more IC chips 104. For example, in various implementations, the multi-core processor 106 operates as the central processing unit (CPU) of the computing device 102 the one or more cores 108 respectively include micro-processors that execute instructions of computer programs by performing the basic arithmetic, logical, control and input/output (I/O) operations specified by the instructions. The computing device 102 can further include memory 118 to store the instructions. The computing device 102 can also include one or more chip cooling apparatus components 110 provided on, within, or near the one or more IC chips. As described infra, the one or more chip cooling apparatus components 110 facilitate non-uniform cooling of the one or more IC chips and the respective cores 108 formed thereon, thereby enabling some of the cores to be cooled to lower temperatures than others (referred to herein as being "overcooled") and thus enabling the overcooled cores to be run at higher voltages and operating frequencies than the other cores. In some embodiments, the computing device 102 can further include a thread controller 114 that assigns threads or computational tasks/workloads to the respective cores 108 of the multi-core processor 106. In one or more embodiments, the computing device 102 can also include a voltage/frequency controller 116 that can direct one or more of the cores 108 to perform an assigned computational task/workload at a defined operating voltage or frequency.

The computing device 102 can further include a device bus 112 that electrically and communicatively connects the various hardware and software components of the computing device 102, including but not limited to, the one or more IC chips 104, the multi-core processor, the respective cores, the one or more chip cooling apparatus components 110, the thread controller 114, the voltage/frequency controller 116 and the memory 118. It should be appreciated that although not shown, the computing device 102 can include various additional hardware and software components that facilitate performance of various operations of a computing device which can vary depending on the type and features/functionalities of the computing device 102. Some examples of these additional hardware and software components are described infra with reference to FIG. 15. Further, in various additional embodiments, the one or more IC chips 104 can include various other electrical components integrated thereon that operate at different voltages and/or operating frequencies (e.g., optical communication devices, high-power radio frequency devices, etc.). The subject cooling techniques can be extended to provide targeted cooling to certain areas of the chip or chip package that include other electrical components that operate at relatively higher voltages or operating frequencies, in addition to the multiple cores 108.

It should be appreciated that the number of cores 108 can vary from 1 to N, wherein N is an integer greater than 1. The multiple cores 108 can be integrated onto a single IC die or chip or onto multiple chips that can be coplanar or stacked and contained within a single chip package. In some implementations, the cores 108 are homogenous. According to these implementations, the respective cores 108 can include same or substantially the same hardware configurations, be configured to operate using the same or substantially the same operating frequency capacity, be configured to operate using the same or substantially the same voltage capacity, and/or can be configured to perform the same or substantially the same computational tasks. In other implementations, the respective cores 108 are heterogeneous. According to these implementations, at least one of the respective cores 108 can: include a different hardware configuration relative to another core of the respective cores 108, be configured to operate using a different operating frequency capacity relative to the other core of the respective cores 108, be configured to operating using a different voltage capacity relative to the other core of the respective cores 108, and/or be configured to perform a different specialized computational task relative to the other core of the respective cores 108.

In accordance with various embodiments, regardless of whether the cores 108 are homogeneous or heterogeneous, a first subset (including one or more) of the cores 108 can be operated at a higher voltage and/or operating frequency relative to a second subset (including one or more) of the cores 108. For example, in an embodiment in which the respective cores 108 are homogeneous, each of the cores 108 can be configured to operate within a range of operating voltages or frequencies. According to this example, each of the cores 108 can be configured to operate using a low voltage or frequency for most computational tasks or workloads. However, the first subset of the cores 108 can be selected to operate at a higher operating voltage or frequency for one or more defined computational tasks or workloads that require a higher operating voltage or frequency based on a time constraint assigned for completion of the task or workload and/or a degree of processing strain/complexity associated with performance of the computational task or workload. In this scenario, if performance of a defined computational task or workload requiring a high voltage or operating frequency is requested, the thread controller 114 can direct the one or more of the cores 108 included in the first subset to perform the defined computational task or workload and the voltage/frequency controller 116 can direct the one or more cores 108 included in the first subset to perform the defined computational task or workload using the higher operating voltage or frequency. The voltage/frequency controller 116 can further direct the one or more cores included in the first subset to return to operating using the low voltage or frequency after completion of the defined computational task or workload. The specific operating voltages and/or frequencies for different computational tasks or workloads can be defined or determined at runtime based on various factors (e.g., power level, a task priority scheme, current processing tasks scheduled and/or being performed by the respective cores 108, etc.).

In an embodiment in which the respective cores 108 are heterogonous, a first subset of the cores 108 can include one or more first cores that are configured to operate using a higher voltage and/or operating frequency relative to a second subset of the one or more cores 108. For example, a first subset of the cores 108 can include high performance cores configured to operate up to about 5.0 Ghz and the second subset of cores can include low frequency or low power cores configured to operate up to about 2.0 Ghz. In this scenario, when performance of a defined computational task or workload requiring a high voltage or operating frequency is requested, the thread controller 114 can direct the one or more of the cores 108 included in the first subset to perform the defined computational task or workload using the higher operating voltage or frequency. Likewise, when performance of a defined computational task or workload requiring a low voltage or operating frequency is requested, the thread controller 114 can direct the one or more of the cores 108 included in the second subset to perform the defined computational task or workload using the lower operating voltage or frequency. As with the embodiment wherein the cores 108 are homogeneous, the specific operating voltages and/or frequencies for different computational tasks or workloads can be defined or determined at runtime based on various factors (e.g., power level, a task priority scheme, current processing tasks scheduled and/or being performed by the respective cores 108, etc.).

The one or more chip cooling apparatus components 110 of the computing device 102 can cool the one or more IC chips and the cores 108 respectively provided thereon during electrical operations of the respective cores 108. For example, the respective cores 108 can consume a significant amount of power (e.g., tens to hundreds of watts) and generate a corresponding amount of heat during electrical operation. The one or more chip cooling apparatus components 110 can facilitate removal of this heat to effectuate cooling the one or more IC chips 104 in association with electrical operation of the respective cores. More particularly, the one or more chip cooling apparatus components 110 can non-uniformly cool the one or more IC chips 104 such that a first subset (including one or more) of the cores 108 that operate a higher voltage or operating frequency relative to a second subset of the one or more cores 108 (including one or more cores 108) are cooled to a lower temperature relative to the second subset of the one or more cores.

In various embodiments, the one or more chip cooling apparatus components 110 include a plurality of microchannels through which liquid coolant is passed to effectuate cooling of the one or more IC chips 104. In such liquid cooling schemes, heat may be transferred from the one or more IC chips 104 to the coolant in the cooling channels. Cooling of the IC chip can be achieved via removal of heat from the liquid coolant using a liquid to liquid heat exchanger or via condensing vapor resulting from boiling of the liquid coolant within the channels (e.g., using a condenser). Although various embodiments of the one or more chip cooling apparatus components 110 are described wherein the one or more chip cooling apparatus components 110 include cooling channels, the subject non-uniform cooling schemes can employ other suitable cooling apparatuses provided the cooling apparatuses can cool certain high power/high operating frequency cores of the multi-core processor to lower temperatures than other lower power/lower frequency cores. For example, in an alternative embodiment, the one or more chip cooling apparatus components 110 can include cold plates.

In the embodiment shown, the one or more chip cooling apparatus components 110 are located on the one or more IC chips 104. For example, in various embodiments the chip cooling apparatus components 110 can be embedded within an IC chip above or below the respective cores 108. However, other suitable configurations are envisioned. For example, in other embodiments, the one or more chip cooling apparatus components 110 can be located off of the one or more IC chips 104 yet adjacent to the upper or lower surfaces of the one or more chips, respectively. However, in various embodiments, the one or more chip cooling apparatus components 110 are located within close proximity to the cores 108 (e.g., less than 200 μm and preferably about 100 μm) to enable selective cooling of the respective cores 108.

Figure 2:
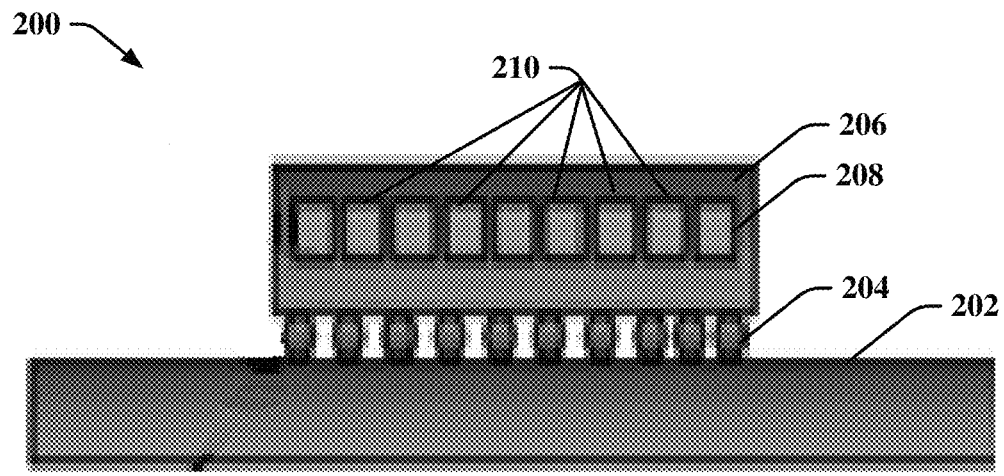
FIG. 2 illustrates an example IC chip and IC chip stack with embedded cooling in accordance with one or more embodiments described herein.
Figure 2:
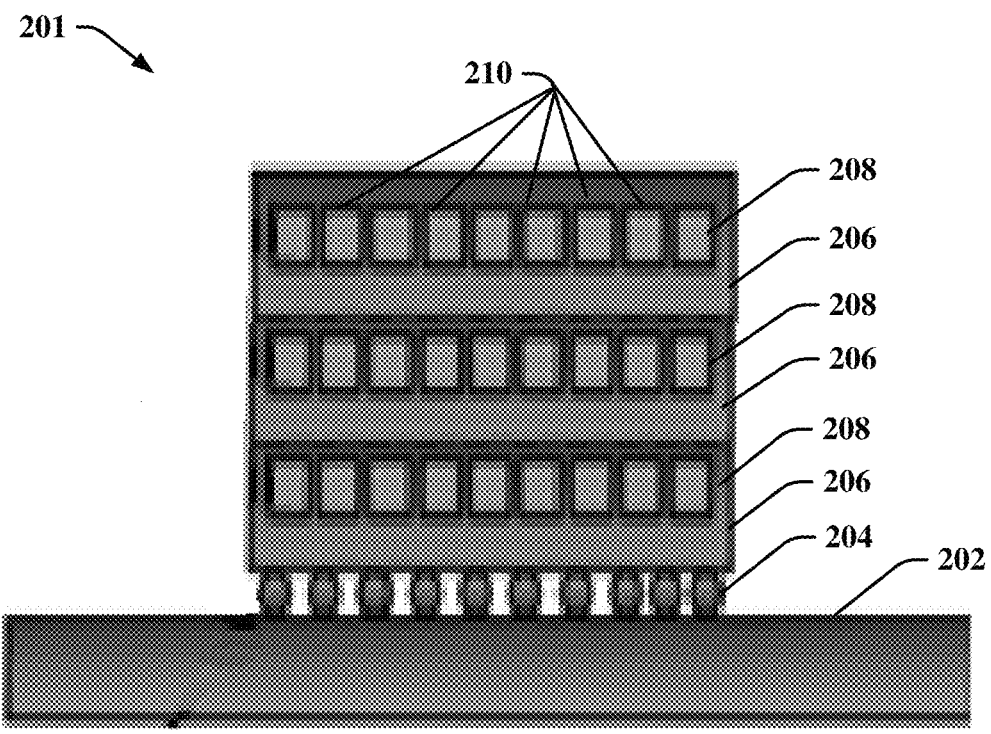

FIG. 2 illustrates an example IC chip 200 and IC chip stack 201 with embedded cooling in accordance with one or more embodiments described herein. In some implementations, the one or more IC chips 104 of computing device 102 includes IC chip 200 and vice versa. In other embodiments, the one or more IC chips 104 of computing device 102 includes IC chip stack 201, and vice versa. Repetitive description of like elements employed in respective embodiments is omitted for sake of brevity.

In accordance with various embodiments, an IC chip 200 with embedded cooling includes a cooling 208 layer formed within a chip substrate 206, such as a semiconductor substrate (e.g., including silicon (Si), geranium (Ge), or another suitable material). The cooling layer 208 includes a plurality of microchannels 210 through which liquid coolant is passed. In various embodiments, the cooling layer 208 can be or include the one or more chip cooling apparatus components 110 of computing device 102 and vice versa. The chip substrate 206 can include an IC active layer formed thereon and/or therein either above or below the cooling layer 208. The IC active layer can include circuitry, such as transistors, that produces heat to be removed from IC chip 200. In various embodiments, the IC active layer includes one or more processing cores (e.g., cores 108). For example, the IC active layer can include one or more microprocessors, digital signal processors, graphics processors, or the like that consume a significant amount of power (e.g., tens to hundreds of watts) and generate a corresponding amount of heat during electrical operation of the device. In some implementations, the cores are homogenous. In other implementations, the cores are heterogeneous.

In various embodiments, the cooling layer 208 and associated microchannels 210 are adjacent to the IC active layer. In one or more implementations, the distance or thickness of the chip substrate 206 between the cooling layer 208 and the IC active layer is about 200 μm or less. In another implementation, the distance or thickness of the chip substrate 206 between the cooling layer 208 and the IC active layer is about 150 μm or less. In yet another implementation, the distance or thickness of the chip substrate 206 between the cooling layer 208 and the IC active layer is about 150 μm or less. The number, dimensions, and configuration of the microchannels 210 can vary such that the microchannels facilitate non-uniform cooling of the IC chip 200. In general, single (e.g., liquid to liquid) or two-phase (e.g., liquid to vapor) heat transfer involving a plurality of small microchannels is beneficial due to larger heat transfer surface per unit flow area near the heat source if compared with large channel or pool boiling approaches. Accordingly, many implementations, cooling is improved as the number of channels increases and the dimensions of the respective channels decreases. Various micro-channel configurations and mechanisms that provide for non-uniform cooling of the IC chip are discussed in greater detail infra.

The chip substrate 206 can be physically and electrically coupled to a printed circuit board (PCB) 202 or other suitable packaging substrate using various soldering mechanisms. In the embodiment shown, the chip substrate 206 is physically and electrically coupled to the PCB 202 via solder balls 204 (e.g., using a flip chip method or other suitable method). The IC chip stack 201 includes a plurality of IC chips 200 mounted upon one another. Accordingly, the IC chip stack 201 can include a plurality of cooling layers 208 respectively having a plurality of microchannels 210 embedded within chip substrates 206. The chip substrates 206 of the IC chip stack 201 can respectively include one or more processing cores (e.g., cores 108). The respective chip substrates 206 of the IC chip stack 201 can be physically and electrically connected to one another using various soldering mechanisms. IC chips and chip stacks with embedded cooling, such as IC chip 200 and IC chip stack 201, exhibit substantially higher thermal resistance relative to IC chips and chip stacks that are air cooled.

Figure 3:
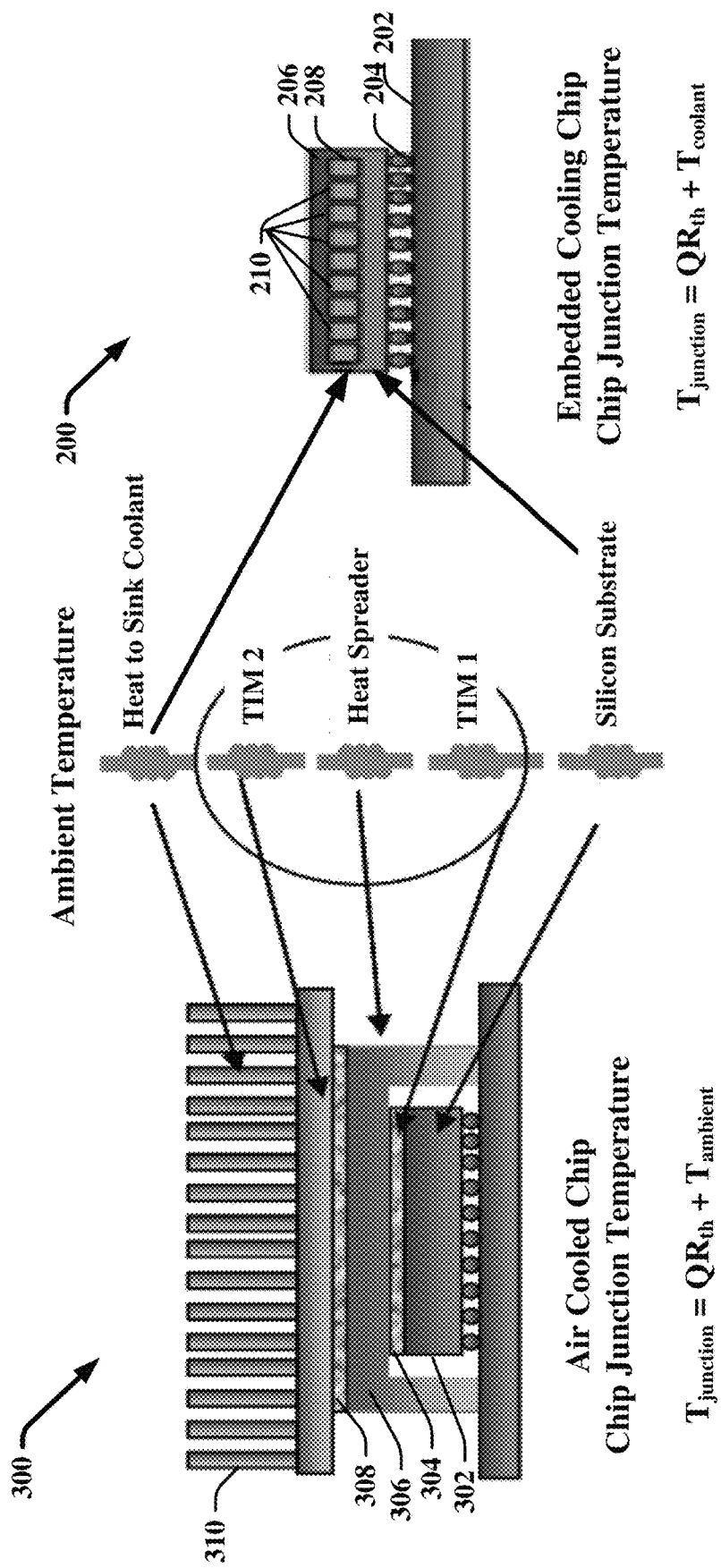
FIG. 3 provides an illustration comparing the thermal resistances of an IC chip that is air cooled and an IC chip that is cooled with embedded cooling in accordance with one or more embodiments described herein.

For example, FIG. 3 provides an illustration comparing the thermal resistances of a typical air cooled IC chip package 300 and a IC chip 200 with embedded cooling in accordance with one or more embodiments described herein. Repetitive description of like elements employed in respective embodiments is omitted for sake of brevity.

A typical air cooled chip package 300 can include a chip substrate 302 or die of standard thickness (e.g., 780 μm), a first thermal interface material 304 (TIM 1) providing thermal contact between the substrate and a heat spreader 306 (e.g., typically made of copper) provided over the TIM 1. The heat spreader 306 is attached through a second thermal interface material 308 (TIM 2) to an air cooled heat sink 310 which conducts heat to the room ambient environment. The chip junction temperature ($T_{junction}$) for the air cooled chip package can the thermal resistance $T_{th}$ of the device multiplied by the power dissipated by the device (Q) plus the ambient temperature ($T_{ambient}$). In standard data centers, the ambient temperature is typically around 25° C. Assuming the total thermal resistance for a typical air cooled chip package 300 is approximately 0.24 Celsius/Watt (° C./W) and the central processing unit (CPU) provided on the chip substrate 302 operates at about 250 W, the resulting temperature gradient between the ambient air and the chip substrate 302 would be about 60° C. This can result in a chip junction temperature of 85° C. for the air cooled chip package. The chip junction temperature ($T_{junction}$) for the air cooled chip package is the thermal resistance $T_{th}$ of the device multiplied by the power dissipated by the device (Q) plus the coolant temperature ($T_{coolant}$). The embedded cooling concept proposed can lower the thermal resistance to about 0.04 C/W or less for the IC chip 200 with embedded cooling, thereby significantly reducing the chip junction temperature (e.g., to about 35° C. as opposed to 85° C.) which is highly desirable to minimize processor power consumption with respect to similar computational throughput.

The lower thermal resistance achievable through liquid cooling such as the embedded cooling technology described above can enable year-round outdoor ambient cooling of data center servers, thereby reducing the cooling energy required to transfer the chip heat to the outdoor ambient environment. Accordingly, the use of liquid cooling can significantly minimize cooling power dissipated in data centers with respect to the inefficient air-cooling methods utilized today. This can reduce the effective Carbon Dioxide emission of data centers to a minimum.

With reference back to FIG. 1, in embodiments in which liquid cooling is employed, cooling of the one or more IC chips (e.g., IC chip 200 or IC chip stack 201) can be achieved via removal of heat from liquid coolant that is passed through cooling channels located on, within or near the one or more IC chips using a liquid to liquid heat exchanger or via condensing vapor resulting from boiling of the liquid coolant within the channels (e.g., using a condenser). According to these embodiments, the one or more chip cooling apparatus components 110, the condenser/heat exchanger 124 and the wet/dry cooler 130 together form a cooling apparatus or cooling system that facilitates removing such heat from the one or more IC chips 104, thereby cooling the one or more IC chips 104.

In one or more implementations, the cooling apparatus or cooling system is a closed loop system including a first loop between the one or more chip cooling apparatus components 110 and the condenser/heat exchanger 124 and a second loop between the wet/dry cooler 130 and the condenser/heat exchanger 124. In such a closed loop system liquid coolant can be continually passed or pumped in the first loop from the condenser/heat exchanger 124 to the more chip cooling apparatus components 110 through an inlet 120 and excreted from the one or more chip cooling apparatus components 110 as heated liquid coolant or vapor through an outlet 122 back to the condenser/heat exchanger 124 (e.g., the first loop). In addition, in the second loop, liquid coolant is continuously transferred from the condenser/heat exchanger 124 to the wet/dry cooler 130 via outlet 126, where heat from the liquid coolant is dissipated into the outdoor environment via the wet/dry cooler 130. The liquid coolant with the heat removed is then transferred back to the condenser/heat exchanger 124 by the wet/dry cooler 130 via the inlet 128.

Figure 4:
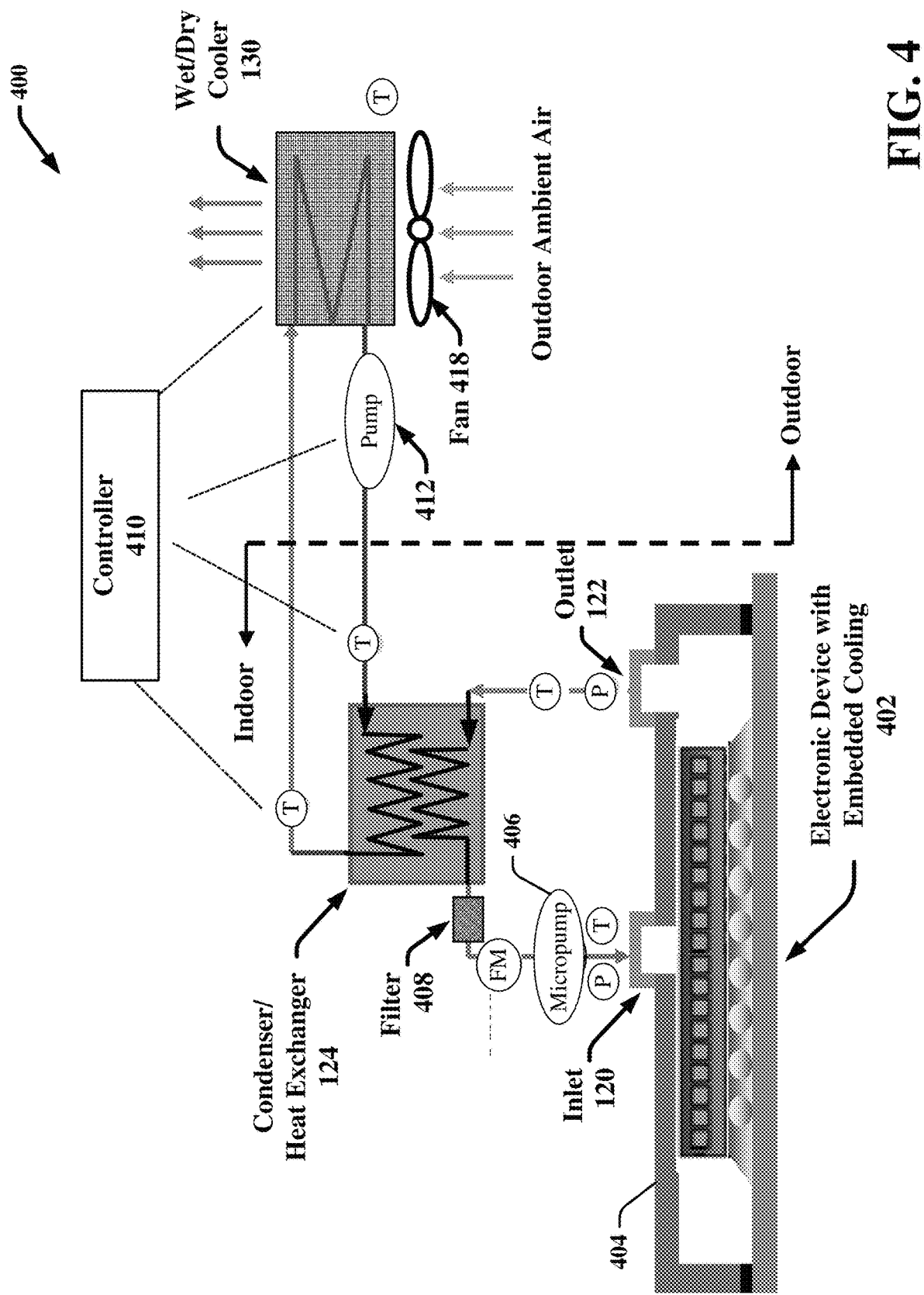
FIG. 4 illustrates an example closed loop cooling system that facilitates non-uniform cooling of an electronic device with embedded cooling in accordance with one or more embodiments described herein.

For example, FIG. 4 illustrates an example closed loop cooling system 400 that facilitates non-uniform cooling of an electronic device with embedded cooling in accordance with one or more embodiments described herein. Repetitive description of like elements employed in respective embodiments is omitted for sake of brevity.

In particular, FIG. 4 presents a system level schematic of the thermal path of a closed loop cooling apparatus/system including an electronic device with embedded cooling 402, a condenser/heat exchanger 124 and a wet/dry cooler 130. In various embodiments, the electronic device with embedded cooling 402 can be or include the one or more IC chips 104, IC chip 200 or IC chip stack 201, encased in a protective housing or packaging 404. Thus the electronic device with embedded cooling 402 can thus be included on or within the computing device 102 of system 100. Cooling system 400 presents the thermal path from the electronic device with embedded cooling 402 to the ultimate heat sink. Repetitive description of like elements employed in respective embodiments is omitted for sake of brevity.

The cooling system 400 includes a first or primary closed coolant loop between the condenser/heat exchanger 124 and the electronic device with embedded cooling 402. The primary closed coolant loop transfers the heat from the electronics device with embedded cooling 402 to a secondary liquid loop which further transfers the heat to the wet/dry cooler 130 to dissipate the heat to the outdoor ambient environment. The wet/dry cooler 130 can include a fan 418 that cools the heated liquid coolant received from the condenser/heat exchanger 124. As the liquid coolant is cooled, the liquid coolant is pumped back to condenser/heat exchanger 124 (e.g., via pump 412) where it is run back through the primary loop. In various embodiments, one or more aspects of the closed loop cooling system 400 can be controlled via a controller 410 that is external to the electronic device with embedded cooling 402.

For example, liquid coolant can be pumped (e.g., via micro pump 406) from the condenser/heat exchanger 124 through an optional filter 408 to the cooling channels of the electronic device with embedded cooling 402 through an inlet 120. In the embodiment shown the closed loop cooling system 400 can include a flow meter (FM) to measure and/or monitor the flow rate of the liquid coolant into the electronic device. The closed loop cooling system 400 can also include one or more pressure sensors (P) and temperature sensors (T) to measure and/or monitor fluid temperature and pressure throughout operation of the cooling system 400. The coolant in the primary loop can operate in single phase (that is, completely liquid) or it can operate as a two-phase coolant where, the coolant boils as it flows through the micro-channels. In case of single phase cooling, the coolant is heated by the electronic device as it passes through the micro-channels and the heated coolant is excreted from the micro-channels to the condenser/heat exchanger 124 via the outlet 122. The condenser/heat exchanger 124 can include a liquid to liquid heat exchanger that transfers the heat from the heated coolant to the wet/dry cooler 130. In case of two-phase cooling, instead of excreting heated liquid coolant from the outlet, the liquid coolant is boiled from the micro-channels as it passes there through and vapor is excreted from the outlet 122. Instead of a liquid to liquid heat exchanger, the condenser/heat exchanger 124 can include a condenser that condenses the vapor exiting from the electronic device package and to subsequently transfer the heat to the secondary liquid loop. In one or more implementations, if the temperature of the coolant in the secondary loop is sufficiently high, the heat could be recovered resulting in further improvement in system efficiency. Compared to a baseline air cooled system, cooling system 400 can provide significant reduction in cooling energy (e.g., a 20× reduction).

With reference back to FIG. 1, the mechanism via which the one or more chip cooling apparatus components 110 facilitate cooling certain areas of the one or more IC chips 104 having one or more of the cores 108 desired to be overcooled can vary depending on the type of cooling technique (e.g., single-phase or two-phase cooling) employed by the one or more chip cooling apparatus components 110 and whether the chip cooling apparatus components 110 perform active or passive cooling. The term "active cooling" is used herein to refer to controlling select areas of the chip and associated cores to be overcooled and undercooled during run-time of the computing device 102. In particular, in various embodiments, a subset (including one or more) of the cores 108 that are to be run at a higher frequency relative to other cores can be determined prior to fabrication of the one more IC chips 104 and/or prior to integration of the one or more chip cooling apparatus components 110 on, within or near the one or more IC chips 104. This decision can be made based on statistical distribution of core-to-core variability, chip test or qualification data, chip layout and cooling apparatus capabilities. The chip cooling apparatus components 110 can further be designed to overcool those cores determined to be run at the higher frequency and then integrated on, within or near the chip. According to these embodiments, the subset of cores that are overcooled by the chip cooling apparatus components 110 do not change following integration of the one or more chip cooling apparatus components 110 on, within, or near the one or more IC chips 104. Thus the chip cooling apparatus components 110 are considered to "passively" cool the one or more IC chips 104.

In other embodiments, the subset of the cores 108 to be run at the higher frequency and thus overcooled can be determined after incorporation of the one or more chip cooling apparatus components 110 on, within or near the one or more IC chips 104. The subset of the cores 108 to be overcooled can be determined based on the above defined factors or actively by performing in-situ calibration of each core performance for different workloads. According to these embodiments, the one or more chip cooling apparatus components 110 can be actively manipulated during runtime to control cooling of the respective cores as needed. Thus the chip cooling apparatus components 110 are considered to "actively" cool the one or more IC chips 104. Various features and functionalities of the one or more chip cooling apparatus components 110 and the computing device 102 associated with active cooling are discussed in greater detail infra with reference to FIGS. 9, 10 and 11.

In one or more embodiments in which the chip cooling apparatus components 110 include a plurality of microchannels through which liquid coolant is passed, the chip cooling apparatus components 110 can provide non-uniform cooling by controlling the amount and flow rate of the liquid coolant through the respective microchannels. For example, in embodiments in which the condenser/heat exchanger 124 includes a liquid to liquid heat exchanger that removes heat from liquid coolant expelled from the microchannels (e.g., single-phase cooling), the one or more chip cooling apparatus components 110 can be designed to provide a higher amount and flow rate of the liquid coolant to one or more areas of the one or more chips including cores that are desired to be overcooled. Alternatively, in embodiments in which in the condenser/heat exchanger 124 includes a condenser that removes heat from liquid coolant provided in the microchannels via boiling of the liquid coolant and condensing the resulting vapor (e.g., two-phase cooling), the one or more chip cooling apparatus components 110 can be designed to provide a lower flow rate of the liquid coolant to one or more areas of the one or more chips including cores that are desired to be overcooled. In particular, the degree of cooling associated with two-phase cooling is directly attributed to the quality of the vapor generated from the boiled liquid coolant. Vapor quality is the mass of the vapor divided by the total mass of the liquid coolant. Vapor quality can be enhanced as the mass of the vapor increases relative to the amount of liquid coolant in the corresponding micro-channel. Accordingly, by reducing the flow rate of liquid cool to a particular area of the chip, the vapor quality associated with that area of the chip and that area of the chip is cooled to a lower temperature relative to other areas of the chip.

In some embodiments, the amount and flow rate of the liquid coolant is controlled through the usage of one or more flow impedance structures (not shown) that are integrated within or near openings of the microchannels. The flow impedance structures physically block or impede the flow of liquid coolant through the respective micro-channels they are associated with. The flow impedance manipulators can thus be arranged to divert liquid coolant to a desired subset of the microchannels associated with an area of the one or more IC chips 104 including one or more cores 108 to be overcooled or undercooled, depending on the type of cooling system employed (e.g., single-phase verses two-phase). For example, in order to increase the flow of liquid coolant to a first subset of microchannels located adjacent to an area of the chip including a core that is to be overcooled, one or more flow impedance structures can be provided near openings of a second subset of the microchannels surrounding the first subset of microchannels. In other embodiments, the amount and flow rate of the liquid coolant to respective areas of the one or more IC chips 104 including cores to be overcooled or undercooled can be controlled via the physical configuration of the microchannels. For example, when single-phase cooling is employed, the one or more chip cooling apparatus components 110 can include a greater number of microchannels adjacent to areas of the chip intended to be overcooled relative to other areas of the chip. In another example, the dimensions (e.g., diameter) of the micro-channels located near different areas of the chip can be varied to achieve different cooling profiles for the different areas.

It should be appreciated that various other mechanisms can be employed to control the amount and flow rate of liquid coolant to select areas of the one or more IC chips 104 and the subject disclosure is not limited to those exemplified herein. For example, in some alternative embodiments wherein the multi-core processor 106 includes a chip stack (e.g., IC chip stack 201), only some of the chips in the stack can include a cooling layer. For instance, the lowermost chip or the uppermost chip can include a cooling layer provided adjacent to the chip. According to this example, the cores (and/or other high power electrical components) that are to be operated at a higher voltage/frequency can be provided on the chips with the cooling layer while the cores that are to be operated at the lower voltage/frequency can be included on the chips without the cooling layer. Also according to this embodiment, additional cooling mechanisms (e.g., air cooling) can be employed in addition to the embedded cooling to facilitate overall reduction in thermal heat resistance of the chip stack.

FIGS. 5, 6, 7 and 8 provide some example, micro-channel configurations and associated liquid coolant flow control mechanics for IC chips including micro-cooling channel that provide non-uniform cooling in accordance with one or more embodiments described herein. Repetitive description of like elements employed in respective embodiments is omitted for sake of brevity.

In various embodiments, the one or more IC chips 104 of computing device 102 can be or include the IC chips presented in FIGS. 5-8 (e.g., IC chip 500, 600, 700 and 800). Each of the IC chips 500, 600, 700 and 800 of FIGS. 5-8 respectively include a plurality of cores (e.g., cores 1-8), and a plurality of channels 506 through which liquid coolant is passed. The channels 506 can be embedded within the chip substrate, provided on an upper or lower surface of the chip substrate, or otherwise located near or substantially adjacent to the chip substrate. The channels 506 are respectively separated by walls 504 or substrate material that is part of the chip substrate (e.g., in embodiments in which the channels 506 are embedded therein) or part of another substrate employed to create the channels 506. It should be appreciated that the respective dimensions of the channels 506 and the walls 504 can vary and the components shown in FIGS. 5-8 are not drawn to scale.

The IC chips 500, 600, 700 and 800 further respectively include flow impedance structures 502 provided at or near openings of selected channels of the plurality of channels 506 that respectively block or impede the flow of liquid coolant through the selected channels. Although in many embodiments, the flow impedance structures 502 are provided at or near the inlets of the channels 506, the flow impedance structures 502 can also be located at or near the outlets of the channels 506 and/or at various locations within the channels 506 between the channel inlets and outlets. In various embodiments, the one or more chip cooling apparatus components 110 of computing device 102 can be or include the channels 506 and the flow impedance structures 502 of IC chips 500, 600, 700 and 800. Repetitive description of like elements employed in respective embodiments is omitted for sake of brevity.

Figure 5:
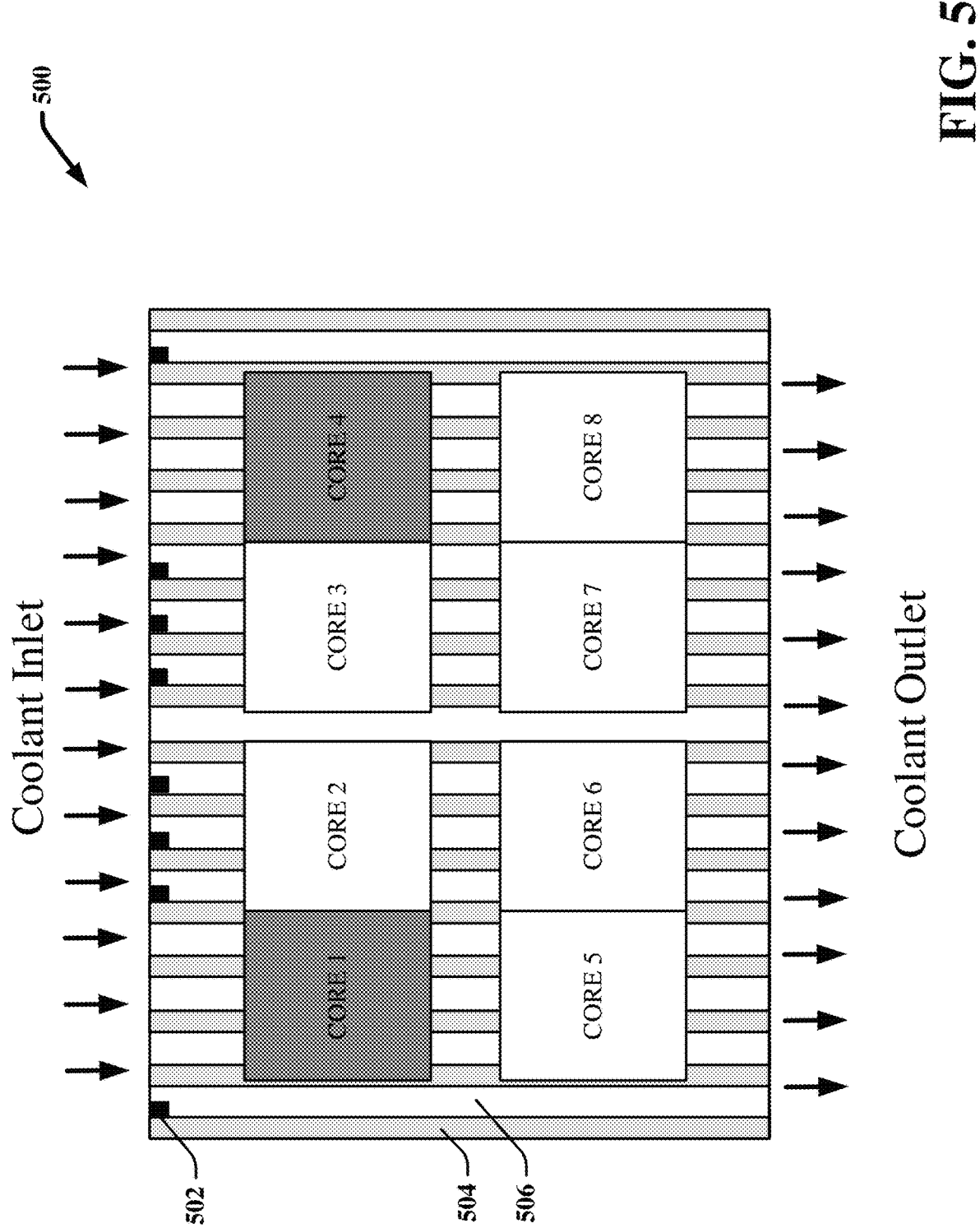
FIGS. 5, 6, 7 and 8 provide example, micro-channel configurations and associated liquid coolant flow control mechanics for IC chips including micro-cooling channel that provide non-uniform cooling in accordance with one or more embodiments described herein.

With reference now to FIG. 5, IC chip 500 can include a cooling channel and flow impedance structure configuration that facilitates overcooling cores 1 and 4 in association with a single-phase cooling apparatus/system (e.g., using a liquid to liquid heat exchanger to cool heated liquid coolant expelled from the channels 506). Cores 1 and 4 are depicted in a dark grey fill coloration to indicate they are overcooled. Accordingly, cores 1 and 4 can be operated at a higher operating voltage and/or frequency relative to cores 2, 3, 5, 6, 7 and 8. For example, as shown in FIG. 5, flow impedance structures 502 are located within the inlets of a first subset of the channels 506 that run below and adjacent to cores 1, 3, 6 and 7. However, flow impedance structures 502 are removed from a second subset of the channels 506 that run below and adjacent to cores 1 and 4. With this configuration, the flow rate of the liquid coolant introduced into the channels 506 via the inlet is increased through the second subset of channels and decreased through the first subset of the channels, thereby resulting in cooling of cores 1 and 4 (and inadvertently cores 5 and 8) to a lower temperature relative to cores 2, 3, 6, and 7 when single-phase cooling is employed.

Figure 6:
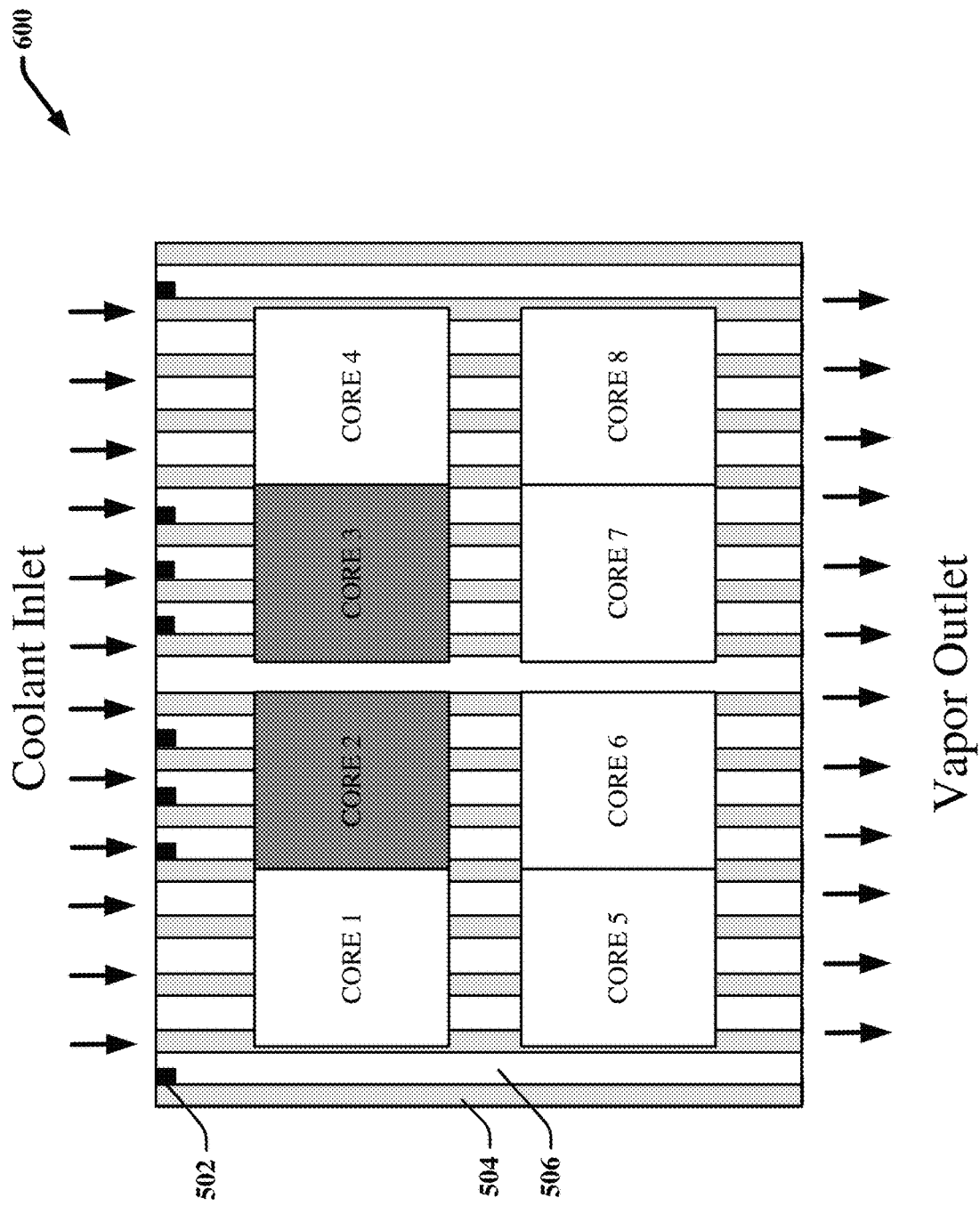

FIG. 6 presents an IC chip 600 including a cooling channel and flow impedance structure configuration that facilitates overcooling cores 2 and 3 in association with a two-phase cooling apparatus/system (e.g., using a vapor to liquid condenser to condense vapor expelled from the channels 506). Cores 2 and 3 are depicted in a dark grey fill coloration to indicate they are overcooled. Repetitive description of like elements employed in respective embodiments is omitted for sake of brevity.

Accordingly, cores 2 and 3 can be operated at a higher operating voltage and/or frequency relative to cores 1, 4, 5, 6, 7 and 8. For example, as shown in FIG. 6, flow impedance structures 502 are located within the inlets of a first subset of the channels 506 that run below and adjacent to cores 2 and 3. However, flow impedance structures 502 are removed from a second subset of the channels 506 that run below and adjacent to cores 1, 4 5 and 8. With this configuration, the flow rate of the liquid coolant introduced into the channels 506 via the inlet is increased through the second subset of channels and decreased through the first subset of the channels, thereby resulting in overcooling cooling of cores 2 and 3 (and inadvertently cores 6 and 7) to a lower temperature relative to cores 1, 4 5 and 8 when two-phase cooling is employed.

Figure 7:
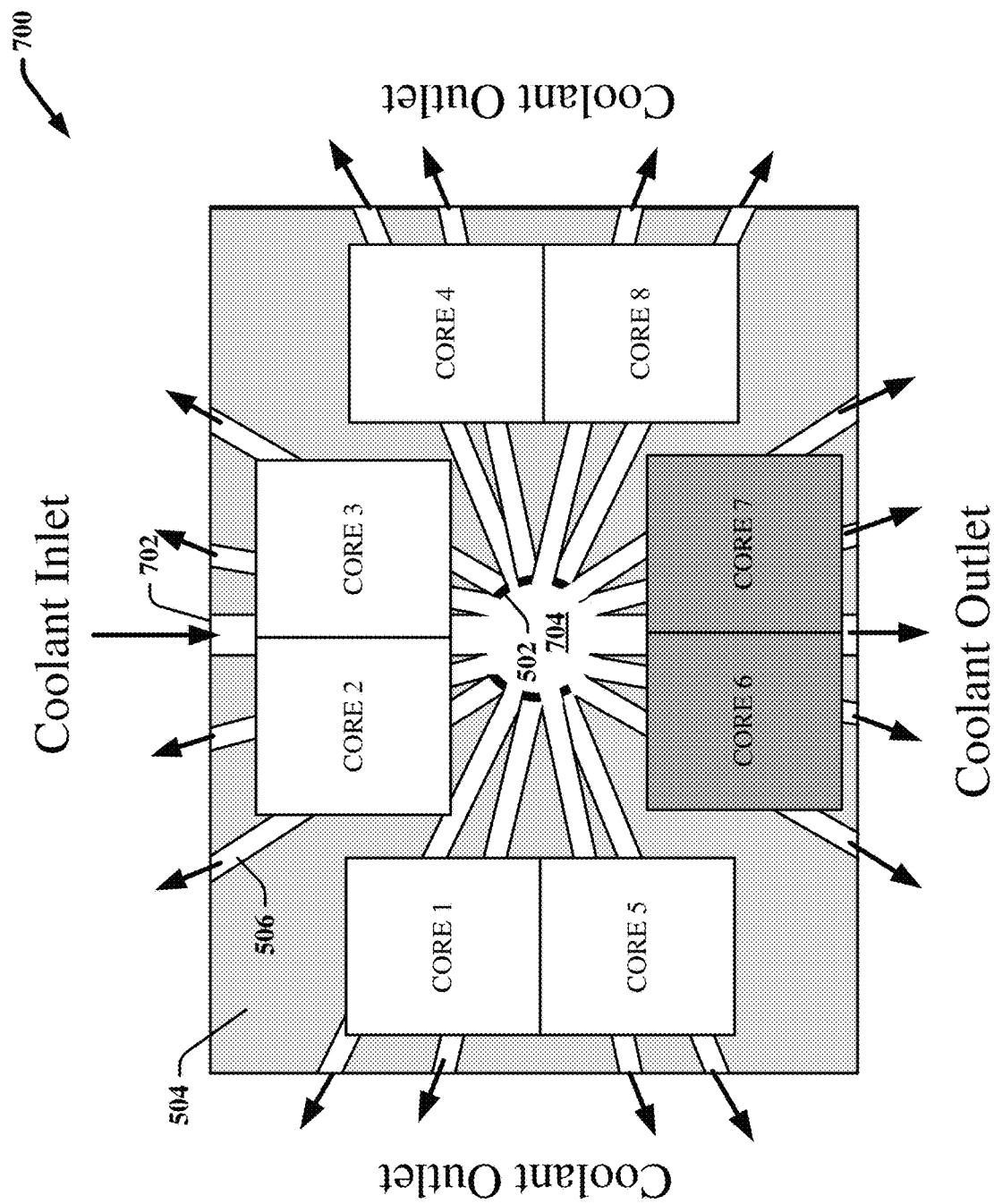

FIG. 7 presents an IC chip 700 including a radial cooling channel and flow impedance structure configuration that facilitates overcooling cores 6 and 7 in association with a single-phase cooling apparatus/system (e.g., using a liquid to liquid heat exchanger to cool heated liquid coolant expelled from the channels 506). Repetitive description of like elements employed in respective embodiments is omitted for sake of brevity.

Cores 6 and 7 are depicted in a dark grey fill coloration to indicate they are overcooled. Accordingly, cores 6 and 7 can be operated at a higher operating voltage and/or frequency relative to cores 1, 2, 3, 4, 5 and 8. For example, as shown in FIG. 7, liquid coolant is received by the IC chip 700 through a single inlet channel 702 where it collects in a central trough 704. The liquid coolant is then dispersed in radial directions via channels 506. Flow impedance structures 502 are located at the inlets of a first subset of the channels 506 that run below and adjacent to cores 1, 2, 3, 4, 5 and 8. However, flow impedance structures 502 are removed from a second subset of the channels 506 that run below and adjacent to cores 6 and 7. With this configuration, the flow rate of the liquid coolant introduced into the channels 506 via the inlet channel 702 is increased through the second subset of channels and decreased through the first subset of the channels, thereby resulting in cooling of cores 6 and 7 to a lower temperature relative to cores 1, 2, 3, 4, 5 and 8 when single-phase cooling is employed.

Figure 8:
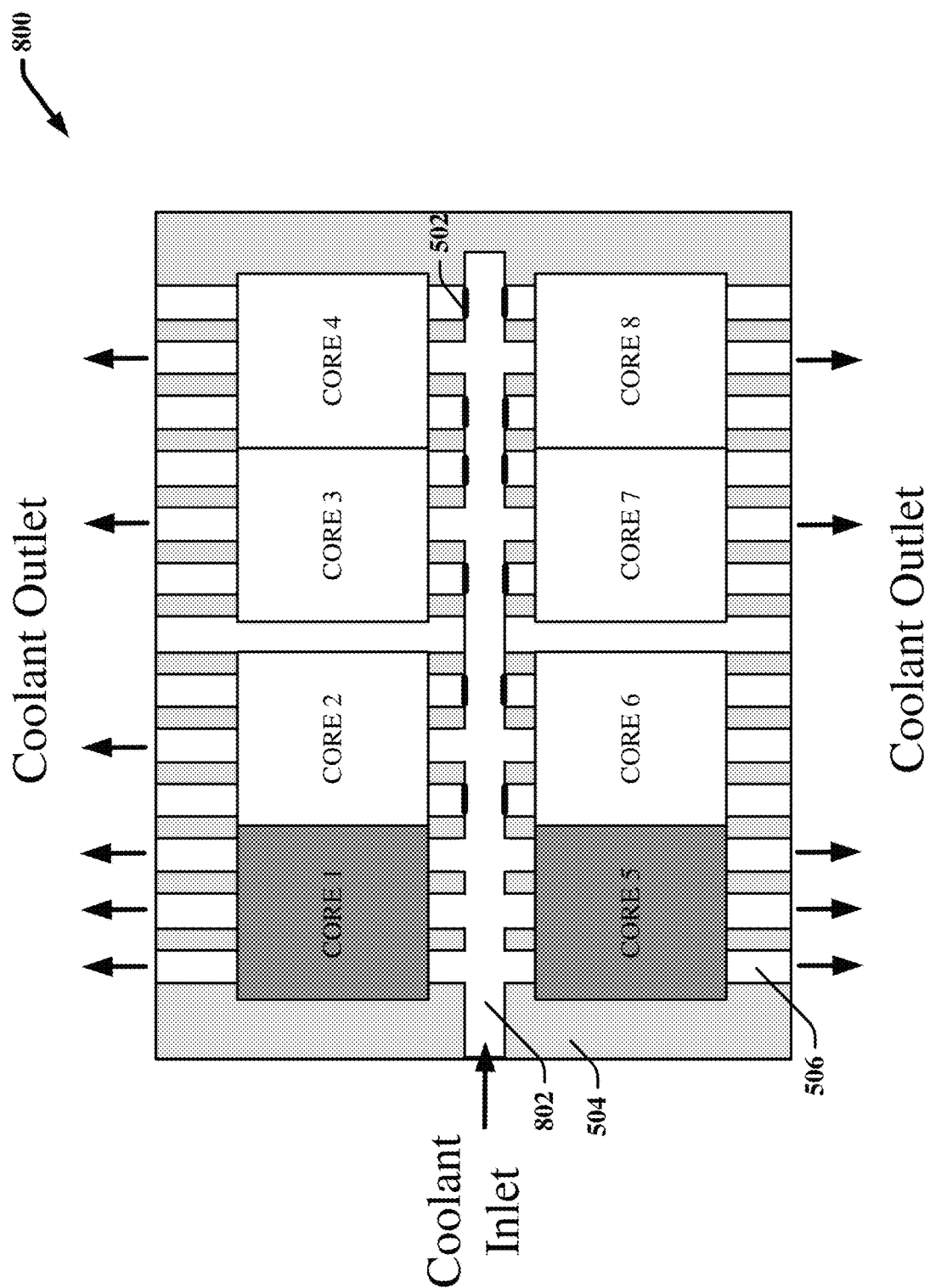

FIG. 8 presents an IC chip 800 including a cooling channel and flow impedance structure configuration that facilitates overcooling cores 1 and 5 in association with a single-phase cooling apparatus/system. Repetitive description of like elements employed in respective embodiments is omitted for sake of brevity.

Cores 1 and 5 are depicted in a dark grey fill coloration to indicate they are overcooled. Accordingly, cores 1 and 5 can be operated at a higher operating voltage and/or frequency relative to cores 2, 3, 4, 6, 7 and 8. For example, as shown in FIG. 8, the IC chip 800 includes a main channel 802 that runs through the center of the chip 800. Channels 506 are provided on either sides of the main channel and run perpendicular to the main channel towards the respective cores. With this configuration, liquid coolant can flow from the main channel to the cores on opposite sides of the main channel 802 substantially evenly when none of the channels are blocked by a flow impedance structure. In the embodiment shown, flow impedance structures 502 are located within the inlets of a first subset of the channels 506 that run below and adjacent to cores 2, 3, 4, 6, 7 and 8. However, flow impedance structures 502 are removed from a second subset of the channels 506 that run below and adjacent to cores 1 and 5. With this configuration, the flow rate of the liquid coolant introduced into the channels 506 via the inlet is increased through the second subset of channels and decreased through the first subset of the channels, thereby resulting in cooling of cores 1 and 5 to a lower temperature relative to cores 2, 3, 4, 6, 7 and 8 when single-phase cooling is employed.

Figure 9:
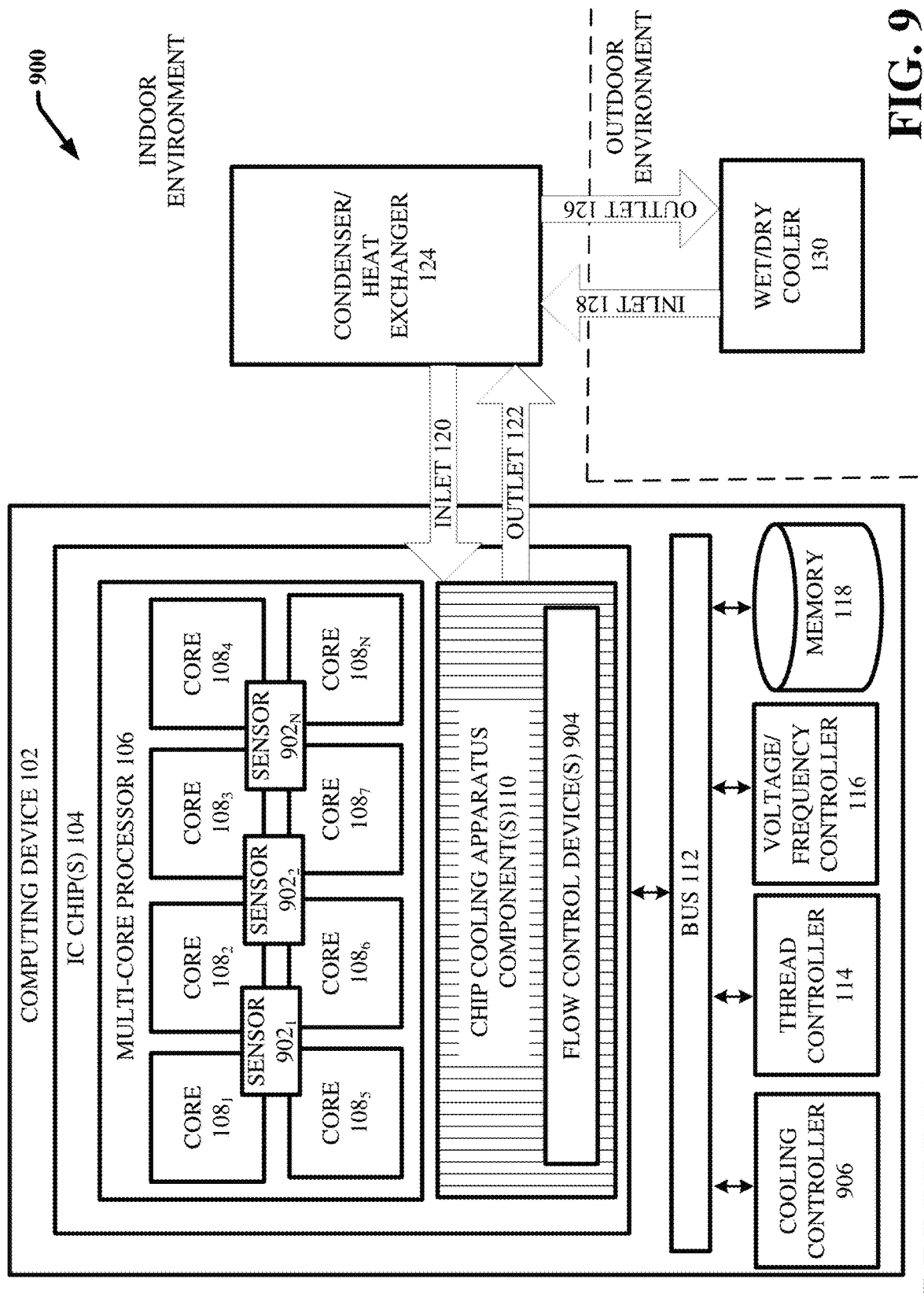
FIG. 9 illustrates a block diagram of an example, non-limiting system that facilitates inducing a heterogeneous microprocessor behavior using non-uniform cooling in accordance with one or more embodiments described herein.

FIG. 9 illustrates a block diagram of another example, non-limiting system 900 that facilitates inducing a heterogeneous microprocessor behavior using non-uniform cooling in accordance with one or more embodiments described herein. System 900 can include same or similar features as system 100 with the addition of one or more thermal sensors 902, one or more flow control devices 904 and cooling controller 906 to the computing device 102. Repetitive description of like elements employed in respective embodiments is omitted herein for sake of brevity.

In various embodiments, the computing device 102 can employ active cooling to selectively cool certain cores or the respective cores 108 during run time. With active cooling, the cooling applied to the respective cores by the one or more chip cooling apparatus components 110 can be dynamically adapted and controlled by the cooling controller 906 based on various factors determined at run time. In particular, in one or more embodiments, the one or more chip cooling apparatus components 110 can include one or more flow control devices 904 that can be actively manipulated by the cooling controller 906 during operation of the computing device 102 to control the amount or degree of cooling applied to each of the cores 108 by the one or more chip cooling apparatus components 110.

In some implementations in which the one or more chip cooling apparatus components 110 include micro-channels through which liquid coolant is passed, the flow control devices 904 can include adjustable flow impedance structures. According to this example, the cooling controller 906 can control a size, shape or position of the adjustable flow impedance structures to increase or decrease the flow rate of liquid coolant through each of the channels. For example, with reference again to FIGS. 5-8, in some implementations, the flow impedance structures 502 can be adjustable such that the cooling controller 906 can move the flow impedance structures to block or impede different subset of the channels 506 during run time of the computing device 102 to selectively increase or decrease the flow of liquid coolant to the respective cores 108. In another example, the size or shape of the flow impedance structures 502 can be adjusted such that the degree of impedance of the respective flow impedance structures 502 can be dynamically controlled. For example, the flow control devices 904 can include piezoelectric devices that can change size, shape or position in response to application of an electrical current thereto. According to this example, each of the channels 506 (or subset of the channel) can include a flow impedance structure provided at an opening thereof and the cooling controller 906 can control the size of each flow impedance structure to control the flow rate of liquid coolant through each channels.

In another implementation in which the one or more chip cooling apparatus components 110 include micro-channels through which liquid coolant is passed, the one or more flow control devices 904 can includes valves provided at the openings of each channel (or subsets of the channels) that can be selectively opened or closed by the cooling controller 906 during run time of the computing device 102 to increase or decrease the flow rate of liquid coolant to the respective cores 108.

Figure 10:
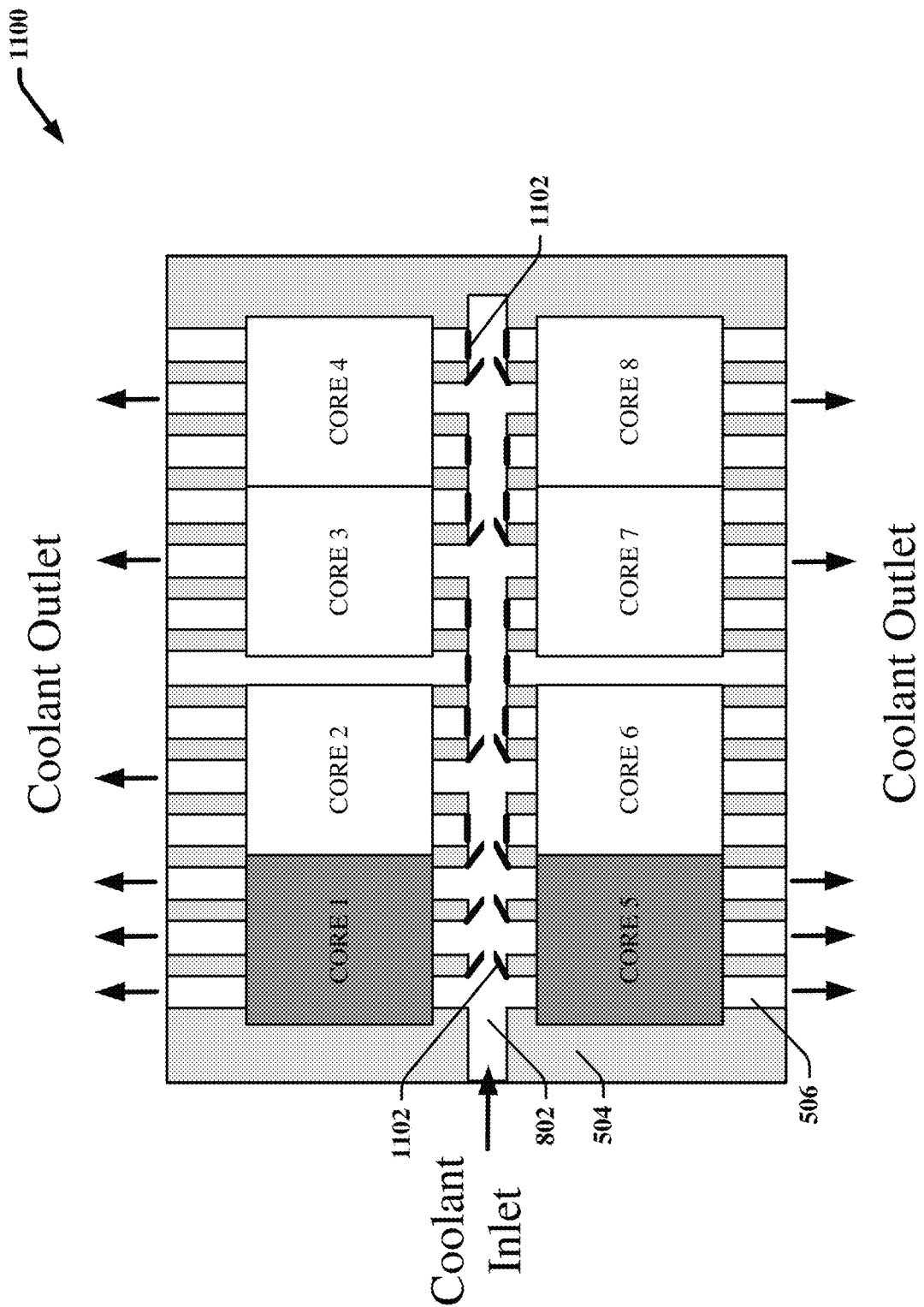
FIG. 10 presents an IC chip including a cooling channel configuration that facilitates actively cooling select cores of a multi-core processor in accordance with one or more embodiments described herein.

For instance, FIG. 10 presents an IC chip 1000 including a cooling channel configuration that facilitates actively cooling select cores of a multi-core processor in accordance with various embodiments described herein. IC chip 1000 is similar to IC chip 800 with the substitution of controllable valves 1102 at the opening of the respective channels 506 as opposed to flow impedance structures 502. Repetitive description of like elements employed in respective embodiment is omitted for sake of brevity.

The cooling channel configuration of IC circuit 1000 includes controllable valves 1102 provided at the inlet of each of the channels 506 that can be in an open or closed state based on a control signal provided by the cooling controller 906. In the embodiment shown, each of the cores 1-8 are associated with three channels 506 that run below and adjacent to the respective cores. The controllable values associated with all three of the cooling channels associated with cores 1 and 5 are provided in an open state. However, only one of the controllable valves 1102 of each set of three channels associated with cores 2, 3, 4, 6, 7 and 8 are in the open state. With this configuration, the flow rate of liquid coolant introduced into the channels 506 via the inlet is increased through the channels associated with cores 1 and 5 and decreased through the channels associated with cores 2, 3, 4, 6, 7 and 8. Thus when single-phase cooling is employed, cores 1 and 5 are cooled to a lower temperature relative to cores 2, 3, 4, 6, 7 and 8. Cores 1 and 5 are depicted in a dark grey fill coloration to indicate they are overcooled. Accordingly, cores 1 and 5 can be operated at a higher operating voltage and/or frequency relative to cores 2, 3, 4, 6, 7 and 8.

Figure 11:
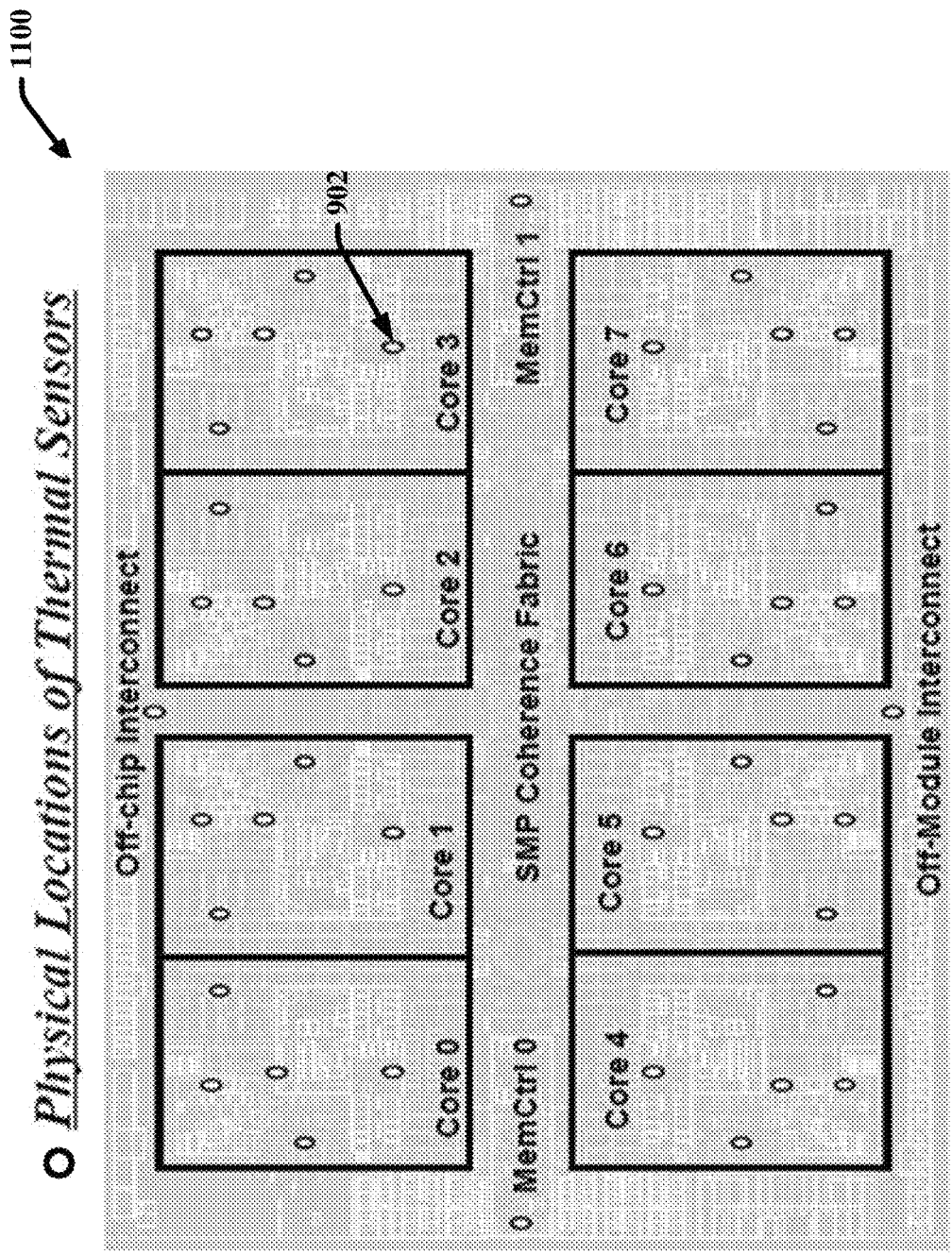
FIG. 11 illustrates an example thermal sensor distribution for an IC chip that can be actively cooled in accordance with one or more embodiments described herein.

With reference back to FIG. 9, in some embodiments, the cooling controller 906 can control the amount or degree of cooling applied to a particular core based on a particular computing task or workload assigned to the particular core at run time and/or a voltage/frequency required for performance of the particular computing task or workload. In particular, the cooling controller 906 can manipulate the one or more flow control devices 904 to overcool cores that are directed to perform computational tasks or workloads using a high operating voltage or frequency. For example, in one implementation, the thread controller 114 can assign a particular computing task or workload to a particular core of the plurality of cores 108, such as core 108$_1$, that requires higher operating voltage or frequency for performance (e.g., due to a computational time constraint associated with completion of the computing task or workload or another factor). In one embodiment, core 108$_1$ may be configured to operate a higher voltage level/frequency than another core of the multi-core processor (e.g., the cores 108 are heterogeneous). According to this embodiment, the thread controller 114 can have assigned the particular computational task or workload to core 108$_1$ based on its ability to operate the higher voltage or frequency. In another embodiment, core 108$_1$ may be configured to operate within a same voltage or frequency range as the other cores of the multi-core processor 106 (e.g., the cores 108 are homogenous). According to this embodiment, the thread controller 114 can arbitrarily assign the particular computational task or workload to core 108$_1$ or assign the computational task to core 108$_1$ based on various other factors determined at run time (e.g., relative workloads of the other cores, relative temperatures of the other cores as determined based on temperature feedback, etc.). However, regardless as to whether the cores 108 are homogeneous or heterogeneous, the voltage/frequency controller 116 can further direct core 108$_1$ to perform the computational task or workload at the higher voltage/frequency based on assignment of the particular computational task or workload thereto. In addition, the cooling controller 906 can adjust the one or more flow control devices 904 to cool core 108$_1$ to a lower temperature relative to one or more other cores of the multi-core processor 106 based on assignment of the demanding computational task or workload thereto and direction to perform the computation task or workload at the higher operating voltage/frequency In various additional embodiments, the cooling controller 906 can control cooling of the respective cores 108 based on temperature feedback regarding respective temperatures of the cores 108 during run time. According to these embodiments, the one or more IC chips 104 can include thermal sensors 902 provided at various locations throughout the one or more IC chips 104 that can continuously or regularly provide temperature feedback identifying respective temperatures of the cores 108. FIG. 11 illustrates an example thermal sensor distribution for an IC chip 1100 that can be actively cooled in accordance with one or more embodiments described herein. The thermal sensors 902 are respectively represented by the circle or oval shapes. In the embodiment shown, thermal sensors 902 are distributed at various locations throughout the IC chip 1100.

For example, in some implementations, the cooling controller 906 can receive temperature feedback regarding respective temperatures of the cores 108 during run time. The cooling controller 906 can further adjust the one or more chip cooling apparatus components 110 to overcool those cores that become relatively hotter than others. This can be a dynamic process wherein the cooling controller 906 regularly adapts the cooling distribution of the chip cooling apparatus components 110 (e.g., via control of the one or more flow control devices 904) to overcool cores as they become relatively hotter than other cores. In some embodiments, the cooling controller 906 can employ a priority scheme wherein the cooling controller 906 ranks the respective cores 108 based on their respective temperatures and controls cooling of the respective cores 108 according to their respective temperatures, wherein hotter cores are prioritized to receive a greater degree or amount of cooling over cooler cores. In other embodiments, the cooling controller 906 can apply relative degrees or amounts of cooling to the respective cores 108 based on their respective temperatures and various temperature thresholds. For example, the cooling controller 906 can apply a first degree of cooling based on the temperature of a core being less than X°, a second degree of cooling based on the temperature of the core being between X° and Y°, and a third degree of cooling based on the temperature of the core being greater than Y°.

In addition, in various embodiments, the thread controller 114 can assign computational tasks and workloads to the respective cores 108 based on their respective temperatures and the voltage/frequency controller 116 can control the operating voltage/frequency of the respective cores based on their respective temperatures. For example, in one implementation, when the computing device is requested to perform a computational task or workload that requires a high operating voltage or frequency to perform (e.g., due to a time constraint associated with performance of the computational task or workload or another factor associated with the computational task or workload), the thread controller 114 can identify a core of the plurality of cores that is the coolest or has a temperature less than a certain threshold and assign the computational task or workload to that core. The voltage/frequency controller 116 can further direct that core to perform the computational task or workload using the high voltage or frequency.

The aforementioned systems, apparatuses, and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 12:
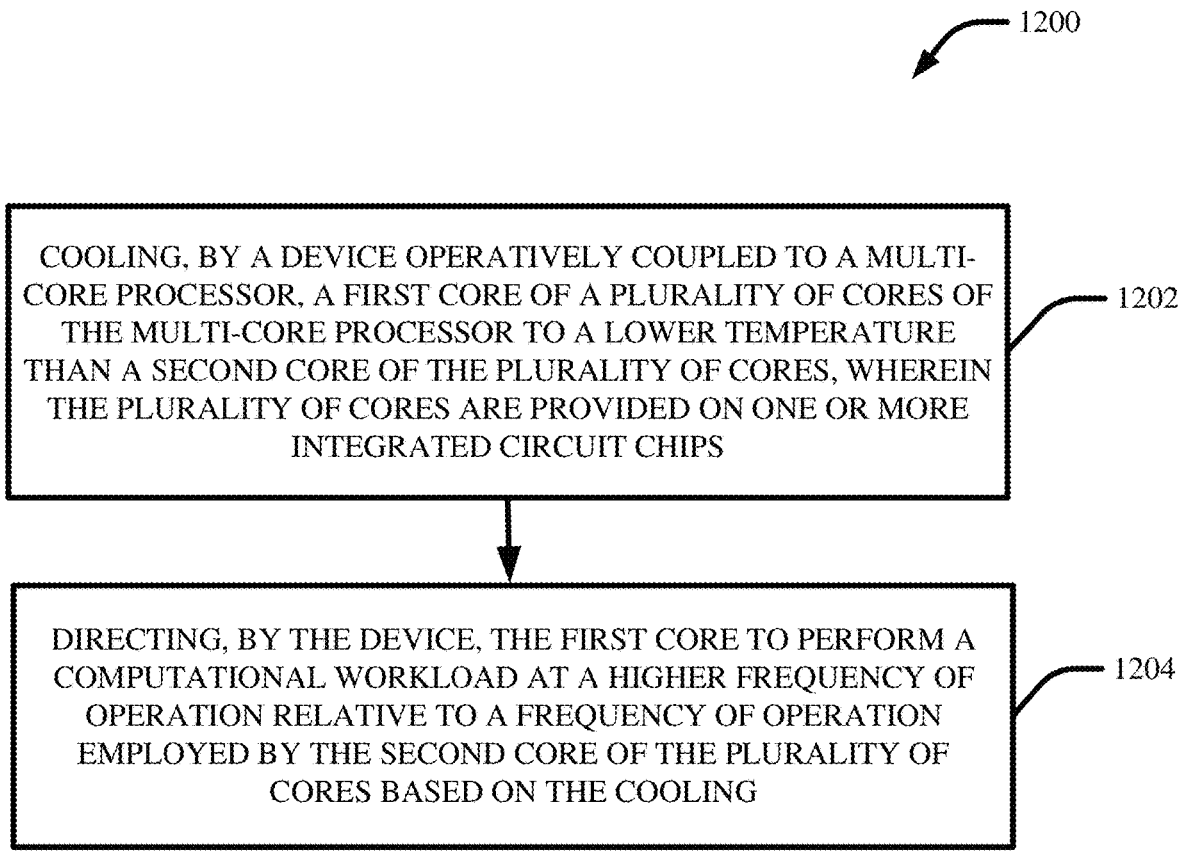
FIG. 12 illustrates a flow diagram of another example, non-limiting computer-implemented method that facilitates inducing a heterogeneous microprocessor behavior using non-uniform cooling in accordance with one or more embodiments described herein.
Figure 13:
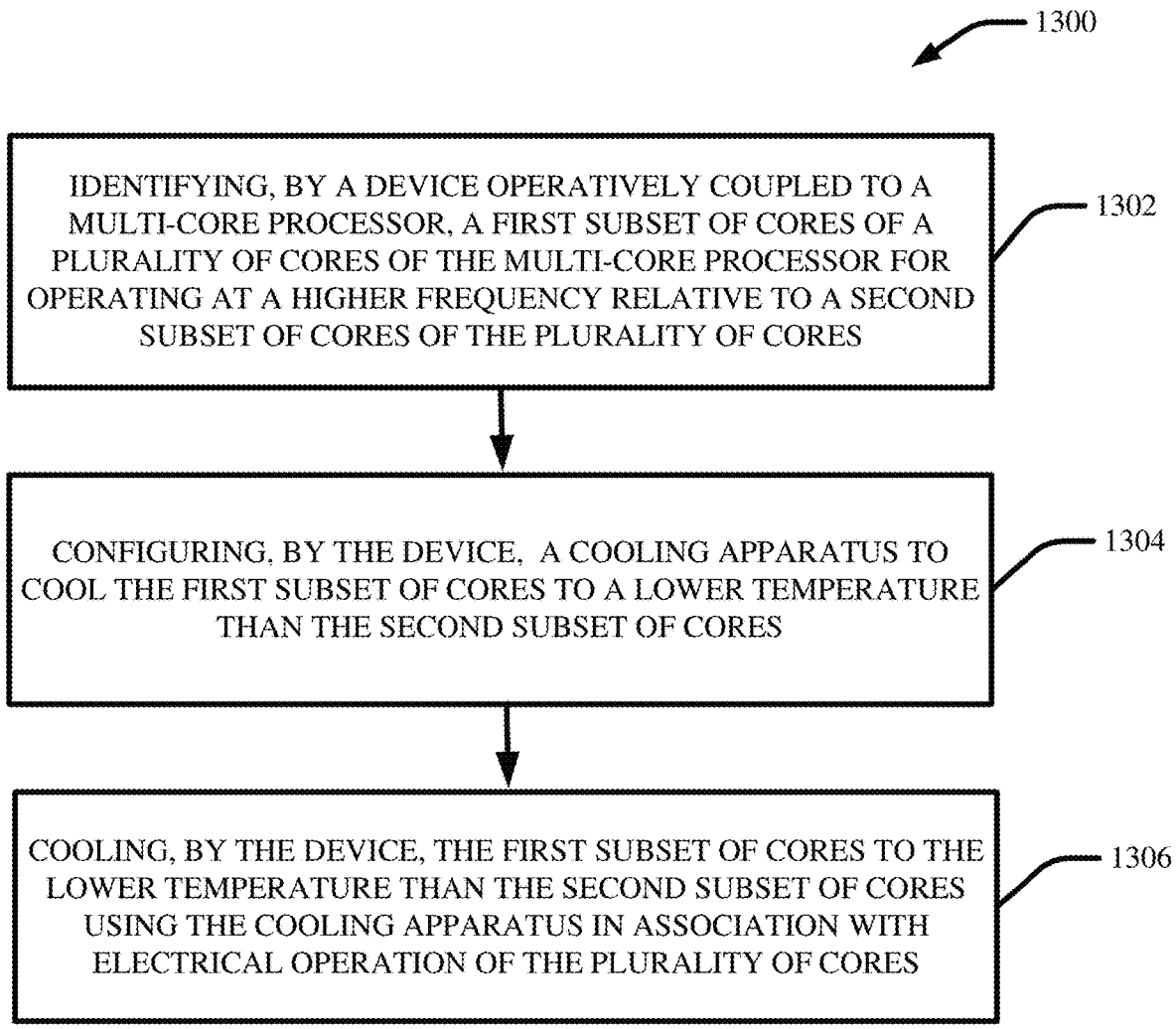
FIG. 13 illustrates a flow diagram of another example, non-limiting computer-implemented method that facilitates inducing a heterogeneous microprocessor behavior using non-uniform cooling in accordance with one or more embodiments described herein.
Figure 14:
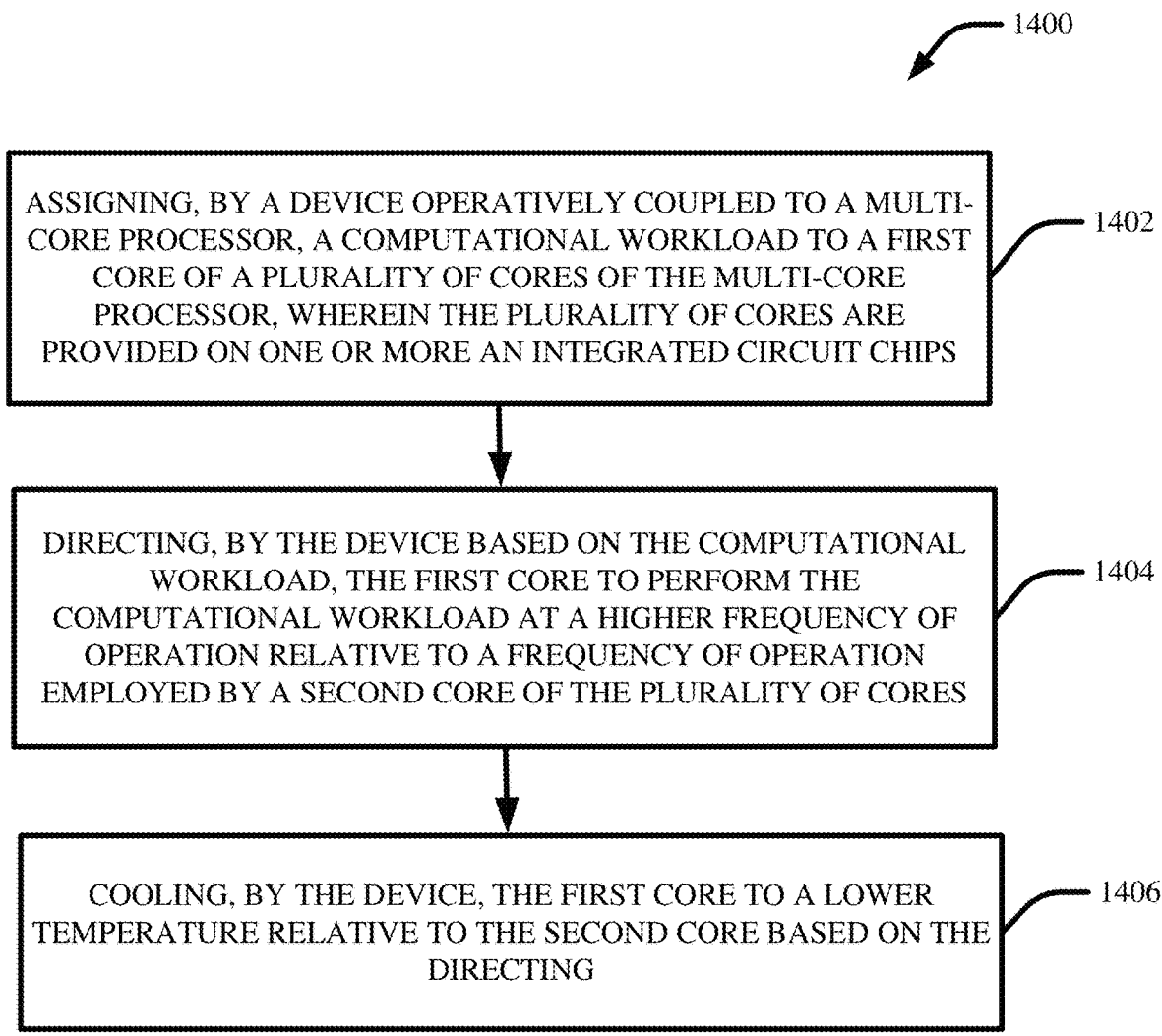
FIG. 14 illustrates a flow diagram of another example, non-limiting computer-implemented method that facilitates inducing a heterogeneous microprocessor behavior using non-uniform cooling in accordance with one or more embodiments described herein.

In view of the example systems, apparatus, and computer readable storage mediums described herein, example methods that can be implemented in accordance with the disclosed subject matter can be further appreciated with reference to the flowcharts in FIGS. 12-14. Repetitive description of like elements employed in respective embodiments is omitted for sake of brevity. For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

FIG. 12 illustrates a flow diagram of another example, non-limiting computer-implemented method 1200 that facilitates inducing a heterogeneous microprocessor behavior using non-uniform cooling in accordance with one or more embodiments described herein. Repetitive description of like elements employed in respective embodiments is omitted for sake of brevity.

At 1202, a device operatively coupled to a multi-core processor (e.g., computing device 102) cools a first core of a plurality of cores of the multi-core processor to a lower temperature than a second core of the plurality of cores, wherein the plurality of cores are provided on one or more integrated circuit chips (e.g., the one or more IC chips 104, and the like). For example, the device can employ the one or more chip cooling apparatus components 110 to non-uniformly cool the one or more IC chips. At 1204, the device directs the first core to perform a computational workload at a higher frequency of operation relative to a frequency of operation employed by the second core of the plurality of cores based on the cooling (e.g., via the thread controller 114).

FIG. 13 illustrates a flow diagram of another example, non-limiting computer-implemented method 1300 that facilitates inducing a heterogeneous microprocessor behavior using non-uniform cooling in accordance with one or more embodiments described herein. Repetitive description of like elements employed in respective embodiments is omitted for sake of brevity.

At 1302, a device operatively coupled to a multi-core processor (e.g., computing device 102) a first subset of cores of a plurality of cores of the multi-core processor for operating at a higher frequency relative to a second subset of cores of the plurality of cores. At 1304, the device configures a cooling apparatus to cool the first subset of cores to a lower temperature than the second subset of cores. For example, in some embodiments, the cores that are to be run at a higher frequency can be determined prior to fabrication of the IC chip and/or prior to integration of a cooling apparatus on or within the chip. This decision can be made based on statistical distribution of core-to-core variability, chip test or qualification data, chip layout and cooling apparatus capabilities. The cooling apparatus can then be designed to overcool those cores to be run at the higher frequency and integrated on, within or near the chip. In other embodiments, the cores to be run at the higher frequency can be determined during run-time based on above defined factors or actively by performing in-situ calibration of each core performance for different workloads. According to these embodiments, the cooling apparatus can be actively manipulated during runtime to control cooling of the respective cores as needed. At 1306, the device cools the first subset of the cores to the lower temperatures than the second subset of cores using the cooling apparatus in association with electrical operation of the plurality of cores.

FIG. 14 illustrates a flow diagram of another example, non-limiting computer-implemented method 1400 that facilitates inducing a heterogeneous microprocessor behavior using non-uniform cooling in accordance with one or more embodiments described herein. Repetitive description of like elements employed in respective embodiments is omitted for sake of brevity.

At 1402, a device operatively coupled to a multi-core processor (e.g., computing device 102) assigns a computational workload to a first core of a plurality of cores of the multi-core processor, wherein the plurality of cores are provided on one or more an integrated circuit chips (e.g., via thread controller 114). At 1404, the device directs, based on the computational workload, the first core to perform the computational workload at a higher frequency of operation relative to a frequency of operation employed by a second core of the plurality (e.g., by voltage/frequency controller 116 of computing device 102). At 1406, the device cool the first core to a lower temperature relative to the second core based on the directing (e.g., via cooling controller 906 of computing device 102).

Figure 15:
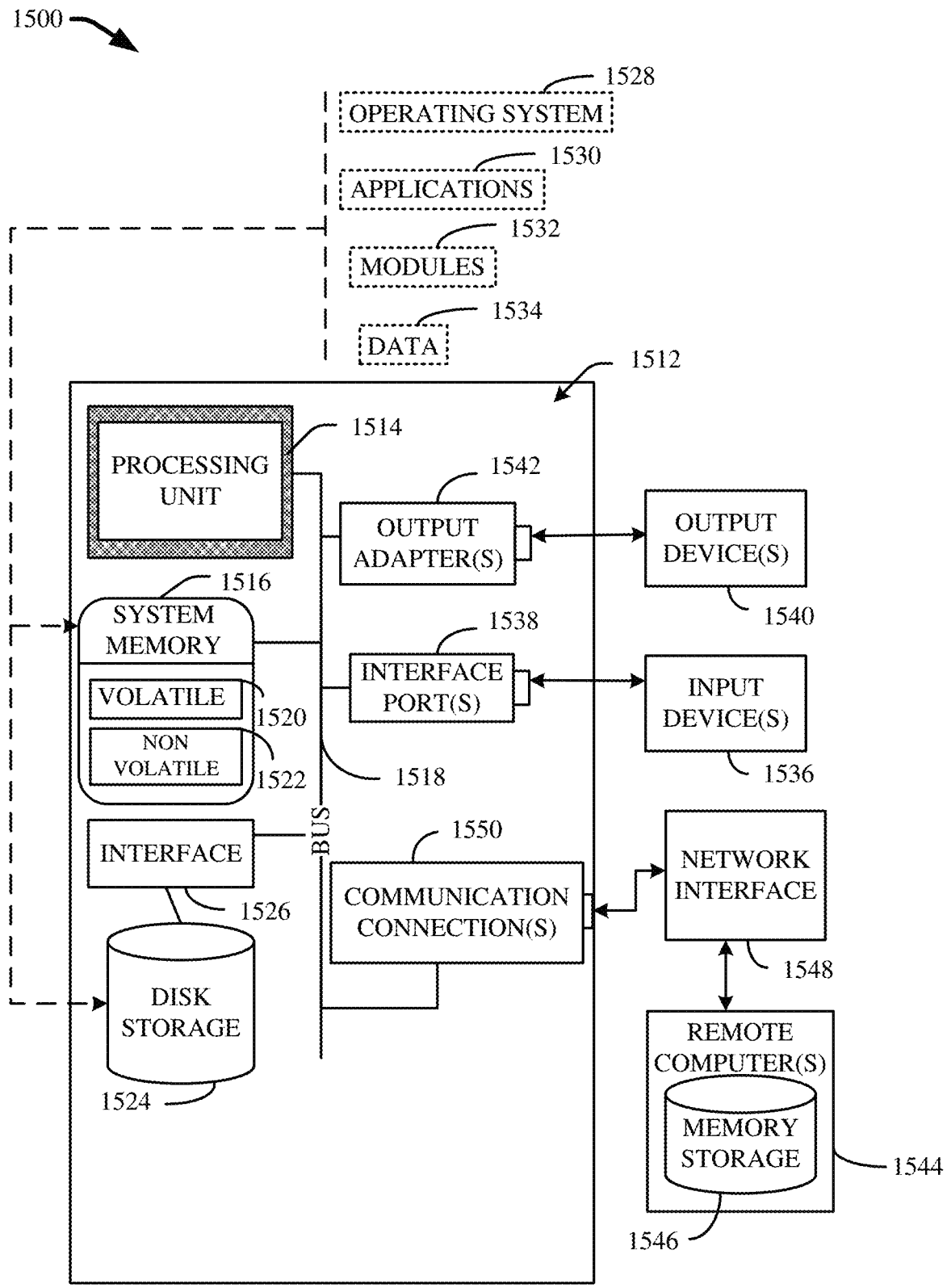
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated.

Repetitive description of like elements employed in other embodiments described herein is omitted for sake of brevity. With reference to FIG. 15, a suitable operating environment 1501 for implementing various aspects of this disclosure can also include a computer 1512. The computer 1512 can also include a processing unit 1514, a system memory 1516, and a system bus 1518. In various embodiments, the computer 1512 can be or include computing device 102 and vice versa. Similarly, the processing unit 1514 can be or include multi-core processor 106 and vice versa. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1594), and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1501. Such software can also include, for example, an operating system 1528. Operating system 1528, which can be stored on disk storage 1524, acts to control and allocate resources of the computer 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for ICry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an IC, an application specific IC (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
an integrated circuit chip comprising a plurality of cores; and
a cooling apparatus coupled to the integrated circuit chip that cools the integrated circuit chip in association with electrical operation of the plurality of cores, wherein the cooling apparatus comprises an electrically controllable flow impedance structure that changes position to control a flow of a liquid coolant through a channel embedded within the integrated circuit chip to cool a first core of the plurality of cores to a lower temperature than a second core of the plurality of cores.

2. The system of claim 1, wherein the first core performs at a higher operation frequency relative to an operation frequency of the second core during the electrical operation of the plurality of cores based on the first core having the lower temperature than the second core.

3. The system of claim 2, further comprising:
a thread controller that assigns a computational workload to the first core based on a time constraint for completion of the computational workload and the higher operation frequency of the first core.

4. The system of claim 1, further comprising:
a thread controller that assigns a computational workload to the first core;
a frequency controller that directs the first core to perform the computational workload at a higher operation frequency relative to a frequency of operation of the second core based on a time constraint for completion of the computational workload; and
a cooling controller that directs the cooling apparatus to cool the first core to the lower temperature than the second core based on the higher operation frequency.

5. The system of claim 1, wherein the first core performs at a higher operation frequency relative to an operation frequency of the second core during the electrical operation of the plurality of cores, and wherein the first core is selected to perform at the higher operation frequency relative to the operation frequency of the second core based on a microarchitecture of the integrated circuit chip.

6. The system of claim 1, wherein the cooling apparatus comprises a plurality of channels embedded within the integrated circuit chip, wherein the cooling apparatus cools the integrated circuit chip via the flow of the liquid coolant through the plurality of channels.

7. The system of claim 6, wherein the cooling apparatus further comprises a heat exchanger connected to the plurality of channels, and wherein the cooling apparatus further cools the integrated circuit chip via removal of heat from the liquid coolant via the heat exchanger after the liquid coolant is expelled from the plurality of channels.

8. The system of claim 6, wherein the cooling apparatus further comprises a condenser connected to the plurality of channels, and wherein the cooling apparatus further cools the integrated circuit chip via boiling of the liquid coolant within the plurality of channels and condensing vapor resulting from the boiling via the condenser.

9. A computer-implemented method comprising:
cooling, by a device operatively coupled to a multi-core processor, a first core of a plurality of cores of the multi-core processor to a lower temperature than a second core of the plurality of cores, wherein the plurality of cores are provided on one or more integrated circuit chips; and the cooling comprises electrically controlling a flow impedance structure to change size to control a flow of a liquid coolant through a channel embedded within the one or more integrated circuit chips, and
directing, by the device, the first core to perform a computational workload at a higher frequency of operation relative to a frequency of operation employed by the second core of the plurality of cores based on the cooling.

10. The computer-implemented method of claim 9, wherein the cooling further comprises:
employing a cooling apparatus embedded within the one or more integrated circuit chips, wherein the cooling apparatus is configured to cool the first core to the lower temperature than the second core.

11. The computer-implemented method of claim 10, wherein the cooling apparatus comprises a plurality of channels embedded within the one or more integrated circuit chips through which the liquid coolant flows and a heat exchanger that removes heat from the liquid coolant after the liquid coolant is expelled from the plurality of channels, and wherein the cooling apparatus cools the first core to the lower temperature by impeding flow of the liquid coolant to one or more channels of the plurality of channels adjacent to the second core.

12. The computer-implemented method of claim 10, wherein the cooling apparatus comprises a plurality of channels embedded within the one or more integrated circuit chips through which the liquid coolant flows and a condenser that condenses vapor resulting from boiling of the liquid coolant in the plurality of channels, and wherein the cooling apparatus cools the first core to the lower temperature by impeding flow of the liquid coolant to one or more channels of the plurality of channels adjacent to the first core.

13. The computer-implemented method of claim 9, wherein the cooling further comprises:
controlling the flow of the liquid coolant through respective channels of a cooling apparatus embedded within the one or more integrated circuit chips, resulting in the cooling of the first core to the lower temperature than the second core.

14. The computer-implemented method of claim 9, further comprising:
identifying, by the device, a first subset of cores of the plurality of cores for operating at the higher frequency relative to a second subset of cores of the plurality of cores, wherein the first subset of cores comprises the first core and the second subset of cores comprises the second core; and
configuring, by the device, a cooling apparatus embedded within the one or more integrated circuit chips to cool the first subset of cores to lower temperatures than the second subset of cores, wherein the cooling the first core to the lower temperature comprises employing the cooling apparatus.

15. A computer-implemented method comprising:
assigning, by a device operatively coupled to a multi-core processor, a computational workload to a first core of a plurality of cores of the multi-core processor, wherein the plurality of cores are provided on one or more an integrated circuit chips;
directing, by the device based on the computational workload, the first core to perform the computational workload at a higher frequency of operation relative to a frequency of operation employed by a second core of the plurality of cores; and
cooling, by the device, the first core to a lower temperature relative to the second core based on the directing, wherein the cooling comprises electrically controlling a flow impedance structure to change size or position to control a flow of a liquid coolant through a channel embedded within the one or more integrated circuit chips.

16. The computer-implemented method of claim 15, wherein the directing comprises directing the first core to perform the computational workload at the higher frequency based on a time constraint for performance of the computational workload.

17. The computer-implemented method of claim 15, wherein the cooling further comprises removing heat from the liquid coolant after the liquid coolant is expelled from a plurality of channels of the one or more an integrated circuit chips.

18. The computer-implemented method of claim 15, wherein the cooling comprising condensing vapor resulting from boiling of the liquid coolant in a plurality of channels of the one or more an integrated circuit chips.

19. The computer-implemented method of claim 15, further comprising:
identifying, by the device, a first subset of cores of the plurality of cores for operating at the higher frequency relative to a second subset of cores of the plurality of cores, wherein the first subset of cores comprises the first core and the second subset of cores comprises the second core; and
configuring, by the device, a cooling apparatus to cool the first subset of cores to lower temperatures than the second subset of cores.

20. The computer-implemented method of claim 15, wherein the cooling further comprises:
controlling flow of the liquid coolant through respective channels of a cooling apparatus embedded within the one or more integrated circuit chips, resulting in the cooling of the first core to the lower temperature than the second core.

* * * * *